(12) United States Patent
Nordstrom et al.

(10) Patent No.: US 9,668,531 B2
(45) Date of Patent: *Jun. 6, 2017

(54) DYNAMIC MATERIALS INTEGRATED INTO ARTICLES FOR ADJUSTABLE PHYSICAL DIMENSIONAL CHARACTERISTICS

(71) Applicant: NIKE, Inc., Beaverton, OR (US)

(72) Inventors: Matthew D. Nordstrom, Portland, OR (US); Patrick Williams, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,821

(22) Filed: Nov. 10, 2015

(65) Prior Publication Data

US 2016/0058086 A1    Mar. 3, 2016

Related U.S. Application Data

(63) Continuation of application No. 14/011,201, filed on Aug. 27, 2013, now Pat. No. 9,192,198.

(51) Int. Cl.
*A41D 31/02* (2006.01)
*A41D 1/00* (2006.01)
(Continued)

(52) U.S. Cl.
CPC ............... *A41D 31/02* (2013.01); *A41D 1/00* (2013.01); *A41D 27/285* (2013.01); *B32B 3/085* (2013.01);
(Continued)

(58) Field of Classification Search
CPC ............... A41D 27/28; A41D 31/0033; A41D 13/0015; A41D 13/0053; A41D 1/04;
(Continued)

(56) References Cited

U.S. PATENT DOCUMENTS 4,791,685 A    12/1988 Maibauer
6,312,784 B2    11/2001 Russell et al.
(Continued)

FOREIGN PATENT DOCUMENTS

EP    2707884 A1    3/2014
JP    2010528893 A    8/2010
(Continued)

OTHER PUBLICATIONS

Japanese Office Action dated May 24, 2016 in Japanese Patent Application No. 2015-529937, 4 pages.
(Continued)

*Primary Examiner* — Bobby Muromoto, Jr.
(74) *Attorney, Agent, or Firm* — Shook, Hardy & Bacon L.L.P.

(57) ABSTRACT

Integrating dynamic materials into articles for adjustable physical characteristics (e.g., aesthetic, functional) can include various systems and methods. For example, in response to a human's body heat, a dynamic material may change shape to allow additional permeability in an article of clothing. Similarly, in response to the presence of moisture, an article of clothing may change shape to prevent the introduction of rain into an internal portion of the article. Additionally, it is contemplated that the shape changing material may change shape that affects a geometric structure of the article as a whole (e.g., protrusions, dimples, vents, etc.).

20 Claims, 20 Drawing Sheets

(51) Int. Cl.
*A41D 27/28* (2006.01)
*B32B 3/08* (2006.01)
*B32B 3/10* (2006.01)
*B32B 3/28* (2006.01)
*B32B 5/02* (2006.01)
*B32B 5/04* (2006.01)
*B32B 37/14* (2006.01)
*D03D 1/00* (2006.01)
*D04B 1/24* (2006.01)

(52) U.S. Cl.
CPC ............ *B32B 3/10* (2013.01); *B32B 3/28* (2013.01); *B32B 5/022* (2013.01); *B32B 5/024* (2013.01); *B32B 5/026* (2013.01); *B32B 5/04* (2013.01); *B32B 37/14* (2013.01); *D03D 1/00* (2013.01); *D04B 1/24* (2013.01); *B32B 2250/02* (2013.01); *B32B 2307/732* (2013.01); *B32B 2437/00* (2013.01); *Y10T 29/49826* (2015.01)

(58) Field of Classification Search
CPC .... A41D 2400/10; A41D 1/00; A41D 13/005; A41D 13/0518; A41D 27/08; A41D 2400/20; A41D 27/285; A41D 31/02
USPC .......... 2/69, 115, 102, 106, 243.1; 73/12.01, 73/379.01, 488, 862.53
See application file for complete search history.

(56) References Cited

U.S. PATENT DOCUMENTS

| | | |
|---|---|---|
| 6,767,850 B1 | 7/2004 | Tebbe |
| 7,437,774 B2 | 10/2008 | Baron et al. |
| 7,457,724 B2 | 11/2008 | Vock et al. |
| 7,623,987 B2 | 11/2009 | Vock et al. |
| 7,754,626 B2 | 7/2010 | Baron et al. |
| 7,881,916 B1 | 2/2011 | Saisan |
| 7,976,924 B2 | 7/2011 | Stanford, Jr. et al. |
| 7,983,876 B2 | 7/2011 | Vock et al. |
| 8,051,582 B2 | 11/2011 | Nurse et al. |
| 8,272,069 B2 | 9/2012 | Hyde et al. |
| 8,474,146 B2 | 7/2013 | Hartford et al. |
| 8,585,746 B2 | 11/2013 | Ilcheva et al. |
| 8,650,764 B2 | 2/2014 | Hartford et al. |
| 8,726,414 B2 | 5/2014 | Baron et al. |
| 9,060,551 B2* | 6/2015 | Nordstrom ............... A41D 1/00 |
| 9,192,198 B2* | 11/2015 | Nordstrom ............... A41D 1/00 |
| 2003/0120183 A1 | 6/2003 | Simmons |
| 2004/0197519 A1 | 10/2004 | Elzey et al. |
| 2005/0204448 A1 | 9/2005 | Wise et al. |
| 2005/0204449 A1 | 9/2005 | Baron et al. |
| 2005/0208266 A1 | 9/2005 | Baron et al. |
| 2005/0208283 A1 | 9/2005 | Baron et al. |
| 2005/0208850 A1 | 9/2005 | Baron et al. |
| 2005/0208857 A1 | 9/2005 | Baron et al. |
| 2005/0208859 A1 | 9/2005 | Baron et al. |
| 2005/0208860 A1 | 9/2005 | Baron et al. |
| 2006/0277786 A1 | 12/2006 | Vattes et al. |
| 2006/0277789 A1 | 12/2006 | Phillips |
| 2007/0016999 A1 | 1/2007 | Harber et al. |
| 2007/0028356 A1 | 2/2007 | Cabauy |
| 2007/0161305 A1 | 7/2007 | Wangbunyen |
| 2007/0220673 A1 | 9/2007 | Nichols |
| 2007/0247465 A1 | 10/2007 | Hadap |
| 2007/0265140 A1 | 11/2007 | Kim et al. |
| 2007/0271820 A1 | 11/2007 | Nurse et al. |
| 2008/0229473 A1 | 9/2008 | Baron et al. |
| 2008/0282455 A1 | 11/2008 | Jones et al. |
| 2009/0006029 A1 | 1/2009 | Vock et al. |
| 2009/0029620 A1 | 1/2009 | Miura |
| 2009/0062892 A1 | 3/2009 | Ilcheva et al. |
| 2009/0162634 A1 | 6/2009 | Baychar et al. |
| 2009/0176054 A1 | 7/2009 | Laib et al. |
| 2009/0297756 A1 | 12/2009 | Dehn |
| 2010/0036639 A1 | 2/2010 | Vock et al. |
| 2010/0119792 A1 | 5/2010 | Ma |
| 2010/0137064 A1 | 6/2010 | Shum et al. |
| 2010/0218301 A1 | 9/2010 | Messiou |
| 2010/0269244 A1 | 10/2010 | Nurse et al. |
| 2011/0046715 A1 | 2/2011 | Ugbolue |
| 2011/0143892 A1 | 6/2011 | Karecki et al. |
| 2011/0270435 A1 | 11/2011 | Hyde et al. |
| 2011/0308113 A1 | 12/2011 | Hartford et al. |
| 2012/0111381 A1 | 5/2012 | Solotoff |
| 2012/0129416 A1 | 5/2012 | Anand et al. |
| 2012/0222189 A1 | 9/2012 | Sokolowski et al. |
| 2012/0291564 A1 | 11/2012 | Amos et al. |
| 2013/0318830 A1 | 12/2013 | Hartford et al. |
| 2013/0344761 A1 | 12/2013 | Williams |
| 2014/0053311 A1 | 2/2014 | Nordstrom et al. |
| 2014/0053312 A1 | 2/2014 | Nordstrom et al. |

FOREIGN PATENT DOCUMENTS

| | | |
|---|---|---|
| NL | 54366 C | 5/1943 |
| WO | 9905926 A1 | 2/1999 |

OTHER PUBLICATIONS

European Search Report dated Jul. 11, 2016 in European Patent Application No. 13832893.5, 6 pages.
European Search Report dated Apr. 1, 2016 in Application No. 13833313.3, 8 pages.
Russian Office Action Dated Aug. 29, 2016 for Russian Patent Application No. 2015111009, 9 pages.
Australian Office Action Dated Sep. 29, 2016 for Australian Patent Application No. 2013309020, 4 Pages.
Australian Office Action Dated Sep. 29, 2016 for Australian Patent Application No. 2013309017, 3 Pages.
European Search Report dated Oct. 12, 2016 in European Patent Application No. 13832893.5, 10 pages.

* cited by examiner

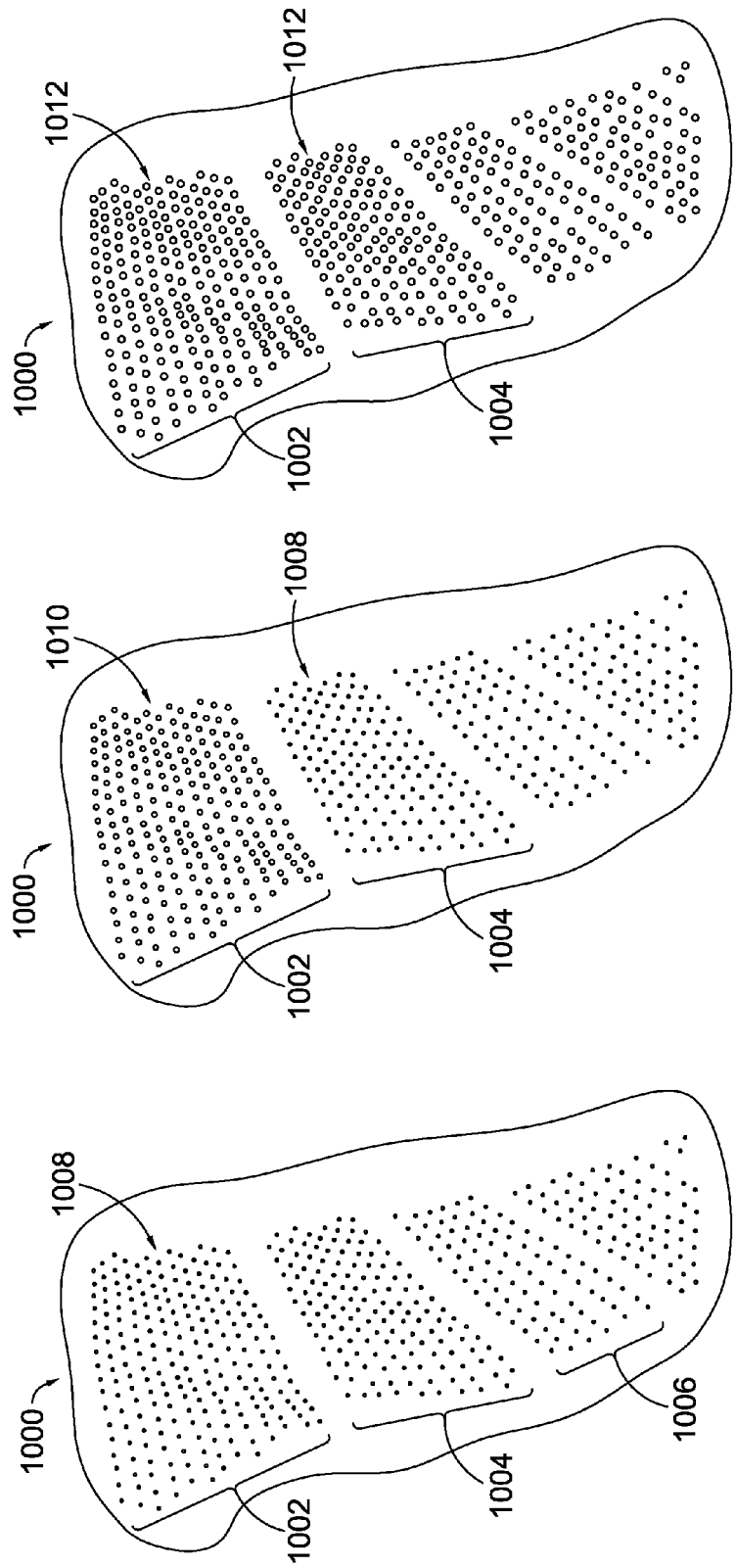

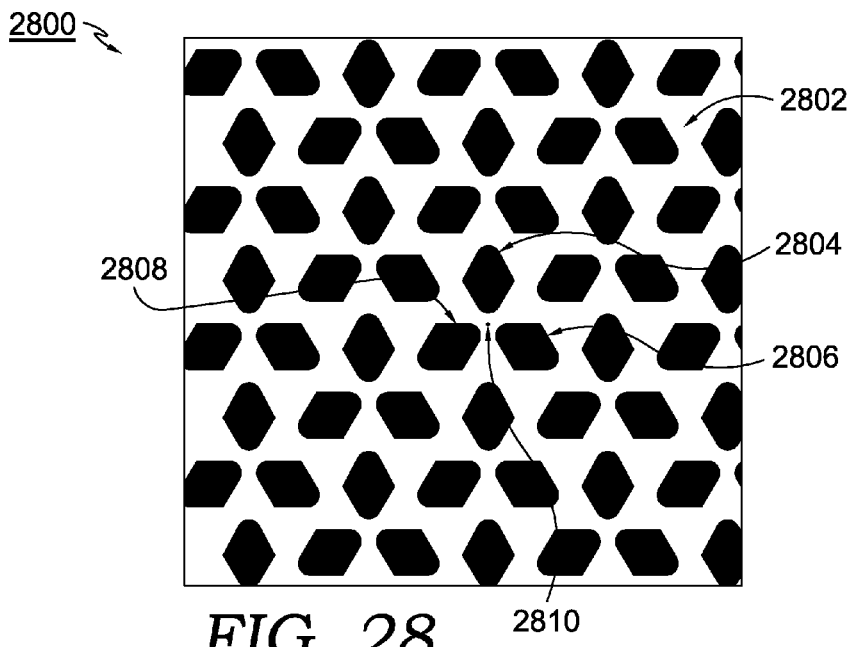
FIG. 28.
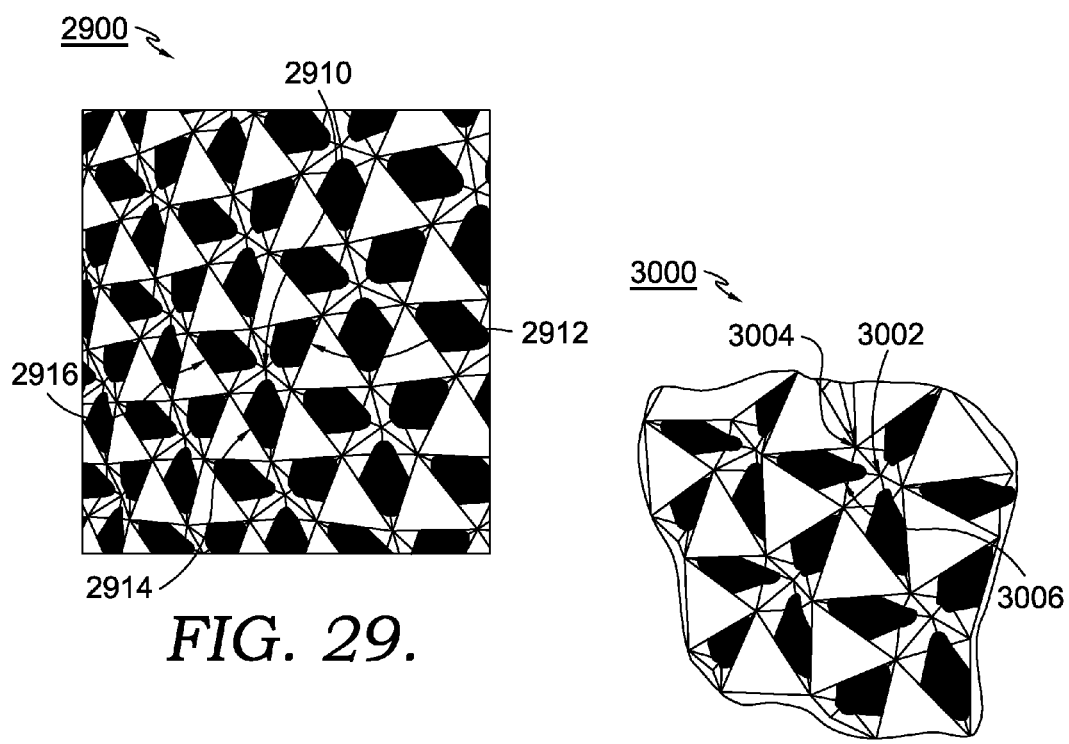
FIG. 29.
FIG. 30.

DYNAMIC MATERIALS INTEGRATED INTO ARTICLES FOR ADJUSTABLE PHYSICAL DIMENSIONAL CHARACTERISTICS

CROSS-REFERENCE TO RELATED APPLICATIONS

This application is a continuation of U.S. application Ser. No. 14/011,201 (filed Aug. 27, 2013), which claims the benefit of U.S. Provisional Application No. 61/693,638 (filed Aug. 27, 2012). Both U.S. application Ser. No. 14/011, 201 and U.S. Provisional App. No. 61/693,638 are incorporated herein by reference in their respective entirety.

BACKGROUND

Dynamic materials are materials that are able to alter shape in response to a stimulus. The stimulus may be in the form of thermal energy (or the lack thereof), moisture content (or the lack thereof), light (or the lack thereof), electrical current (or the lack thereof), magnetic influence (or the lack thereof), and other forms of stimulus.

SUMMARY

Aspects of the present invention relate to systems and methods of integrating dynamic materials into articles for adjustable physical characteristics (e.g., aesthetic, functional). For example, in response to a human's body heat, a dynamic material may change shape to allow additional permeability or loft in an article of clothing. Similarly, in response to the presence of moisture, an article of clothing may close a vent to prevent the introduction of rain into an internal portion of the article. The shape changing material may change shape that merely affects a feature formed by the shape changing material. Additionally, it is contemplated that the shape changing material may change shape that affects a geometric structure of the article as a whole (e.g., protrusions, dimples, vents, etc.).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 10A-10C depict variable apertures in a selected portion of a garment, in accordance with aspects of the present invention;

FIG. 28 depicts an exemplary pattern for an auxetic structure having dynamic material portions forming simple bends, in accordance with aspects of the present invention;

FIG. 29 depicts the auxetic structure of FIG. 28 in a partially dimensioned state, in accordance with aspects of the present invention;

FIG. 30 depicts the auxetic structure of FIG. 28 in a dimensioned state, in accordance with aspects of the present invention;

DETAILED DESCRIPTION

Figure 1:
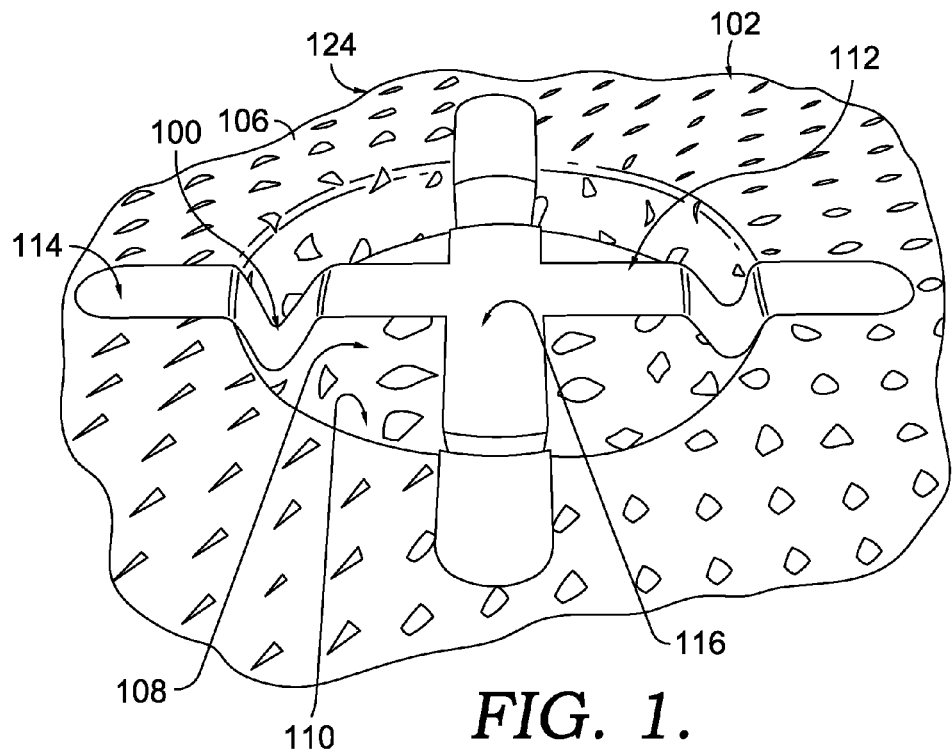
FIG. 1 depicts an exemplary reactive material portion comprised of a base material and a reactive structure, in accordance with aspects of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Aspects of the present invention relate to systems and methods of integrating dynamic materials into articles for adjustable physical characteristics (e.g., aesthetic, functional). For example, in response to a human's body heat, a dynamic material may change shape to allow additional permeability and/or loft in an article of clothing. Similarly, in response to the presence of moisture, an article of clothing may close a vent to prevent the introduction of rain into an internal portion of the article. The shape changing material may change shape that merely affects a feature formed by the shape changing material. Additionally, it is contemplated that the shape changing material may change shape that affects a geometric structure of the article as a whole (e.g., protrusions, dimples, vents, etc.).

A variety of mechanisms, materials, and applications of the materials are contemplated. Further, any combination of mechanisms, materials, and/or applications of the materials may be used. Even if only one particular combination is explicitly recited herein, it is understood that a variety of alternative embodiments may be implemented and are contemplated. For example, even when a shape memory polymer is described in connection with an ink application to form and adjustable-sized aperture, it is contemplated that a magnetic reactive or electrically activated material may be used as an alternative arrangement. Further, other materials not explicitly discussed herein are also contemplated. For example, while portions of the following may explicitly focus on a polymer-like substance, it is contemplated that any potentially dynamic material may be substituted (e.g., metallic, organic/natural). Further, the mechanisms provided herein are merely exemplary in nature and are not limiting. Instead, the mechanisms explicitly recited herein are intended to provide a guide as to the potential implementations of one or more materials to provide an environment-responsive mechanism. Therefore, additional mechanisms are contemplated and provided inherently herein.

The materials, material applications, and/or mechanical structures provided herein are contemplated as being incorporated into one or more articles, in an exemplary aspect. An article is an article of clothing (e.g., under garment, shirt, pant, sock, hat, glove, etc), footwear (e.g., shoe, boot, sandal), padding/protective gear, embellishments, outerwear (e.g., coat, rain suit, etc), and the like. Therefore, it is contemplated that an article includes any component that is worn or used by a human and is able to respond to one or more stimulus to alter characteristics as a result of the stimulus, in an exemplary aspect.

Materials

Dynamic materials contemplated to provide one or more potentially physical reactive responses include, but are not limited to, shape memory polymers, shape memory alloys, electro-activated polymers, magnetic reactive materials, and the like. As previously discussed, additional materials able to responds to one or more stimuli are contemplated. For example, it is contemplated that a material responsive to thermal energy (or heat generated in response to a stimuli) results in a physical shape change. Examples of alternative materials are those in which a magnetic stimulus is converted into a thermal energy that in turn causes a physical change. Similarly, it is contemplated that a material that is effective to receive energy in the form of light energy which is then converted into thermal energy to which a physical change is the response.

A shape memory polymer ("SMP") is a material that when a stimulus is applied, the material returns back to at least one programmed shape. A programmed shape is a formation (two dimensional or three dimensional) that the material is programmed to form without specific manipulation by a human or other machine. For example, a SMP may be a 1 inch wide by 3 inch long, $\frac{1}{32}$ inch thick strip of polymeric material that has a programmed shape of a spring-like coil. In this example, when an external stimulus, such as thermal energy, is introduced to the SMP material, the material goes from a current shape (e.g., flat ribbon) to the programmed state (e.g., spring-like coil) without physical manipulation or other shape-forming processes. Therefore, a SMP may be discussed having at least two shapes, a first shape that is the programmed shape that the SMP will attempt to form when a specific stimulus is introduced and a second shape, which is a shape other than the first shape.

Stimuli that are contemplated as causing a material, such as a SMP, to return to a programmed shape may be thermal energy (e.g., heat), a reduced thermal energy state (e.g., cold), light, moisture, electrical, magnetic, and other forms of energy (lack of energy) and environmental conditions. In an exemplary aspect, it is contemplated that the stimulus is associated with the human body. For example, it is contemplated that changes in skin temperature and/or moisture content is sufficient stimuli to change a SMP from a second shape to a first programmed shape. In an exemplary aspect, it is contemplated that a SMP is stimulated to transition from a second state to a first state in a temperature range of 30 degrees Celsius to 40 degrees Celsius. Further, it is contemplated that an SMP may have an effective zone of thermal reactivity that is within a 3 degree Celsius window. For example, as a human's skin temperature changes from 34 degrees Celsius to 37 degrees Celsius during a period of physical activity, the SMP reacts by changing from a second shape (e.g., having closed apertures, having greater loft characteristics) to a first programmed shape (e.g., having open apertures, having a less loft characteristics). Other thermal ranges are contemplated. Any type of stimulus is also contemplated.

While the previous discussion of a SMP has focused on a two position material (e.g., programmed shape and any other shape), it is contemplated that a three or more shape SMP may be utilized. For example, it is contemplated that an SMP having a first programmed shape at a first temperature, a second programmed shape at a second temperature, and a third shape at all other temperatures below the second temperature may be utilized. A multiple programmed shape polymer may be formed from a composite of two or more SMP having different reactive temperatures or to different intensities of stimulus. The utilization of a multiple programmed shape polymer may provide a non-binary effect such that a greater degree of shape manipulation control may be achieved, in an exemplary aspect.

In other exemplary aspects, the material utilized to accomplish one or more of the functional concepts provided herein may be responsive to electronic input as will be discussed in greater detail with respect to FIGS. 11A through 12B hereinafter. Further, it is contemplated that the material may be responsive to magnetic input, such as a magnetic reactive material. As previously discussed, alternative materials are also contemplated as appropriate options for one or more aspects provided herein.

In an exemplary aspect of the present invention, the two-position material (or multi-position material) may utilize a biasing material to accelerate a return to a first state from a second state upon removal of a stimulus. For example, a SMP that goes from a dimensioned state to a flatter state as temperature increases, may return to the first dimensioned state using a laminated or otherwise coupled biasing material. In an exemplary aspect, the force exerted by a SMP (or any dynamic material) may be greater than a mechanical resistive force applied by the biasing material allowing the SMP to overcome the resistance provided by the biasing material when a stimulus of sufficient intensity is applied. Therefore, it is contemplated that the biasing material may be selected and manipulated to adjust a response stimulus intensity that causes a change in dimension of the SMP. This adjustability allows for an ability to tune the dynamic material to respond to specific stimuli ranges (e.g., certain body temperature ranges). The biasing material may be formed from any material, such as a dynamic material having a different stimuli-response range. Further, it is contemplated that the biasing material may be a non-dynamic material. Further, the biasing material may be selected from a number of suitable materials, such as composites, polymers, organic materials, metallic materials, and the like.

The biasing material may be laminated with the dynamic material, it may be integrated with the dynamic material, it may be positioned proximate the dynamic material and the like. For example, FIGS. 37A-37D depict exemplary arrangement of a dynamic material portion, a biasing material, and one or more carrier materials, in accordance with aspects of the present invention.

Figure 37A:
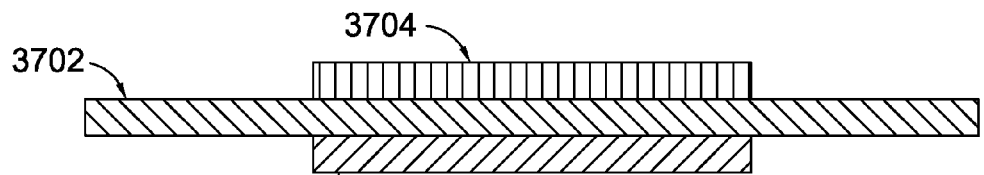
FIGS. 37A-37D depict exemplary arrangement of a dynamic material portion, a biasing material, and one or more carrier materials, in accordance with aspects of the present invention.
Figure 37B:
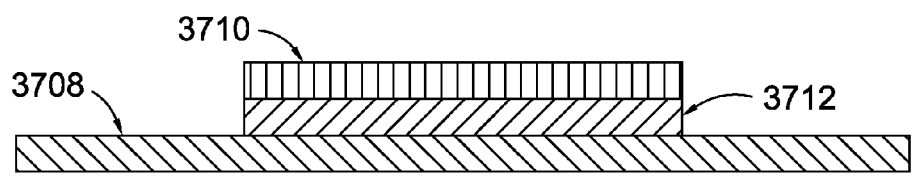
Figure 37C:
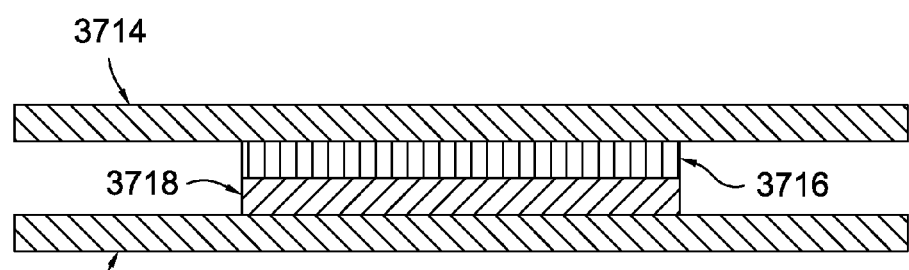
Figure 37D:
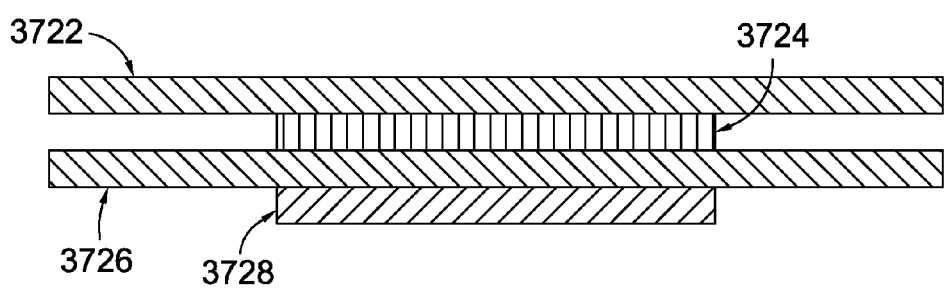

FIG. 37A depicts a carrier material 3702 having a dynamic material 3704 positioned on a first surface and the associated biasing material 3706 on an opposite surface. FIG. 37B depicts a carrier material 3708 having a biasing material 3712 and a dynamic material 3710 positioned on a common surface. While FIG. 37B depicts the biasing material 3712 between the carrier material 3708 and the dynamic material 3710, it is contemplated that the biasing and dynamic materials may be arranged in an alternative relationship. FIG. 37C depicts a first carrier material 3714 and a second carrier material 3720 having between them a biasing material 3718 and the dynamic material 3716. Lastly, FIG. 37D depicts a carrier material 3722 and a second carrier material 3726 maintaining between them a dynamic material 3724 (or in an alternative aspect a biasing material). A biasing material 3728 is positioned on an opposite surface of the second carrier material 3726 than the dynamic material 3724, in this exemplary aspect. It is contemplated that different arrangements of carrier materials, dynamic materials, and biasing materials may be implemented in aspects of the present invention.

Therefore, it is contemplated that the dynamic material, in response to a stimuli, returns to a geometric configuration (e.g., a first state) from a different geometric configuration (e.g., second state). The biasing material may provide a resistive force that causes the biasing material in to the second state when a sufficient level of stimulus is not provided. It is contemplated that the biasing material provides a sufficient amount of force to the dynamic material (and other components of the article) to alter the shape of the dynamic material to the second shape. However, when the provided stimulus exceeds a balancing-level threshold, the dynamic material exerts a force greater than that which is provided by the biasing material. At this tipping point of stimulus, the dynamic material alters in shape to that of the first state. Upon removal of the stimulus (or reduction below a threshold level), the biasing material exerts a greater force on the dynamic material to return to the second state. As a result, a single state dynamic material (i.e., a single learned geometry) may be implemented to achieve a dual state functionality, in an exemplary aspect.

Material Application

Regardless of the material utilized to affect a shape in response to one or more stimulus, it is contemplated that the material may be applied in a variety of manners. For example, it is contemplated that the material may be printed onto an article (or underlying material forming the article), applied as a laminate to the article (or underlying material), incorporated at a fiber level to a material (e.g., woven, knit material), and/or incorporated at the yarn/filament level. Other manners of incorporating a material into an article are contemplated as within the scope of the present disclosure.

Printing of a shape changing material provides a flexible application method that may be implemented utilizing a number of technologies. For example, it is contemplated that a dynamic material, such as a SMP may, be in the form of a polyurethane liquid that may be printed onto a formed article or onto a non-SMP material that will be integrated into the formed article. The printing process may be accomplished with a screen printing technique traditionally used for applying non-functional inks. Further, it is contemplated that a computer controlled printer (e.g., ink jet-like printer) may be utilized to selectively apply a SMP ink.

Printing of a SMP may be done on a two-dimensional surface. In this example, if the desired programmed shape is something other than a two dimensional form, it is contemplated that the material onto which the SMP is printed may then be placed on a mold (e.g., a 3-D form) having the desired programmed shape for "teaching" the SMP the desired programmed shape. As previously discussed, the teaching of a programmed shape may include subjecting the SMP to a stimulus equivalent or greater than will be used to instruct the SMP to return to the programmed shape. For example, when thermal energy is the stimulus, the SMP may learn the programmed shape at a temperature greater than a temperature at which the material returns to the programmed shape from an alternative shape. Consequently, it is contemplated that the mold onto which the printed SMP is placed may provide the necessary thermal energy to teach a shape. Further, it is contemplated that an external thermal energy source (e.g., oven) may be utilized to introduce the necessary stimulus causing the programmed shape to be registered by the SMP.

Further, it is contemplated that the SMP ink may be printed onto the material having the programmed shape. For example, the material onto which the ink is placed may be positioned onto a three-dimensional form prior to being printed and while having the printed material applied. Therefore, it is contemplated that one or more portions of printed SMP ink material are printed on a relatively two-dimensional surface and then subsequently programmed a desired shape or printed onto a three-dimensional surface in the desired programmed shape.

In an exemplary aspect, it is contemplated that an SMP ink may be a polyurethane material that is applied in a liquid-like state. After application of the SMP ink in a liquid-like state, a curing process may be applied that cures the SMP ink into a non-liquid state. The curing process may be done at a temperature that also results in teaching the SMP ink a desired shape. Stated differently, an SMP ink may be cured and programmed in a common process.

One or more mechanical structures contemplated herein may utilize various geometric configurations. For example, a cage-like structure having a low elasticity and a geometric structure of SMP within the cage-like structure will be discussed hereinafter. In this example, the cage-like structure may be formed through a printing process using a first type of ink/material in conjunction with a first screen in a screen-printing process. The geometric structure may also be printed with an SMP material using a second screen in a screen-printing process. Therefore, it is contemplated that a variety of functional structures may be applied to a common article through the use of successive screens.

A second material application contemplated is a sheet-like application, such as a laminate. In an exemplary aspect a SMP is in a sheet-like form that is able to be applied to an article. For example, a laminate structure formed with SMP may bond to an article with the application of heat and/or pressure. The bonding process, much like the previous discussion regarding curing of ink, may be done under conditions that both bond the laminate and teach a desired shape.

The laminate may be applied to the article in a uniform sheet manner. Further, if a desired geometric pattern that is not uniform in nature may be accomplished by post application cutting (e.g., knife, die, laser), masking (e.g., negative masking, positive masking), and other techniques. In the alternative, it is contemplated that the laminate may be formed into a desired geometric pattern prior to being applied to the underlying article. For example, a lattice like structure, as will be discussed hereinafter, may be formed from the sheet-like material by cutting, masking, or other operations prior to being applied.

Similar to the previous discussion on SMP ink teaching, it is contemplated that the laminate SMP material may be applied in a two-dimensional manner and then subsequently formed into a desired three dimensional shape for teaching purposes. Further, it is contemplated that the laminate SMP material may be applied to an article in the desired programmed shape. In yet another aspect, it is contemplated that the laminate SMP material is programmed a desired shape prior to being applied to an underlying article when the bonding of the laminate to the underlying article does not affect the teaching of the SMP laminate shape.

It is contemplated that the SMP laminate may be formed in a layered manner such that a first layer is an SMP material. A second layer may be an adhesive layer. Therefore, the striated layer allows for the SMP material to be bonded with an article without the need for selectively applied bonding agents to the article (e.g., adhesive). Additionally, it is contemplated that a laminate may be referred to as a heat transfer herein, in exemplary aspects.

A third material application contemplated herein is at a fiber level. The fiber level is contrasted with the yarn level that will be discussed hereinafter as a fourth material application. In an exemplary aspect, pluralities of fibers are combined to form a yarn structure. The term yarn encompasses comparables, such as threads, cord, string, and other more macro structures (relative to a fiber level structure) utilized to form woven, knit, and other textile-like structures.

The fiber level material application contemplates incorporating fibers having similar characteristics into a yarn-like structure. Similarly, the fiber level material application also contemplates incorporating two or more fibers having different characteristics into a yarn-like structure. For example, a variable response yarn-like structure may be formed by adjusting the number or type of threads having different characteristics (e.g., temperature at which a programmed shape is activated). Further, the combination of fibers having desired characteristics from an article perspective (e.g., elasticity, hand, strength, toughness, repellency, thermal retention, moisture management, and the like) may be combined with fibers resulting in a SMP-like reaction to one or more stimulus.

A fiber may be formed by extruding a SMP material into an appropriate dimension for incorporation as a fiber into one or more macro structures. Further, it is contemplated that a SMP material may be applied to a non-SMP fiber. For example, a non-SMP fiber may be drawn through a SMP solution to impregnate the fiber with SMP material. Similarly, it is contemplated that a powder SMP material may be applied to a non-SMP fiber, which also imparts SMP onto/into the non-SMP fiber.

The fourth material application, as previously discussed, is a yarn-like structure. The yarn-like structure (referred to hereinafter as yarn) encompasses comparables, such as threads, cord, string, and other more macro structures (relative to a fiber level structure) utilized to form woven, knit, and other textile-like structures. Therefore, as previously discussed with respect to the fiber level material application, it is contemplated that the yarn may be extruded in whole or in part from a SMP material. Further, it is contemplated that an SMP material may be applied to a non-SMP yarn as a whole or in part. For example, individual fiber portions may be incorporated into the yarn that are SMP while other portions are not SMP material based. Further, the yarn may have an SMP solution or powder applied to impart SMP characteristics onto the yarn.

At both the fiber and the yarn level of material application, it is contemplated that an article is formed in whole or in part with the yarn/fiber(s) having SMP characteristics. For example, it is contemplated that an article is formed with a textile having SMP fiber/yarn(s) woven therein. Further, an article may be formed by a knitting process having one or more SMP type yarn/fiber(s). Additionally, an SMP yarn/fiber may be applied, sewn, stitched, inserted, or otherwise incorporated into an article prior to, during, or post processing.

Consequently, a number of methods for imparting dynamic materials into an article are contemplated herein. Regardless of if printing, laminating, fiber incorporation, and/or yarn incorporation is utilized, it is contemplated that any variation of materials and combination may be utilized in one or more aspects.

Mechanical Structures

Turning to the figures that depict exemplary mechanical structures incorporating various materials, material application, and physical components to achieve dynamic material movement with physical changes caused by one or more stimulus. The following are exemplary in nature and are not limiting as to the scope of the concepts provided. Instead, the following mechanical structures provide insight into those structures contemplated and possible for accomplishing control of environmental values utilizing shape memory materials.

FIG. 1 depicts an exemplary reactive material portion 100 comprised of a base material 102 and a reactive structure 112, in accordance with aspects of the present invention. The base material may be a fabric-like material traditionally incorporated into an article. For example, the base material 102 may be an elastic material able to move/wick moisture away from a wearer's body and having a plurality of apertures incorporated therein to provide passive permeability options. As with other components provided herein, exemplary aspects of the base material are not limiting as to the options contemplated.

The reactive structure 112 may be an SMP printed, laminated, or otherwise bonded to the base material 102. The reactive structure 112 may react to any number of stimuli discussed herein, such as temperature changes to a wearer's body. The reactive structure 112 may be programmed to have the shape depicted in FIG. 1 that produces a dimple portion 108 surrounded by a protrusion portion 110 that extends beyond a plane defined by a bottom surface 104 and a top surface 106. For example, when the thermal energy applied to the reactive structure 112 is below the programmed shape temperature, the protrusion portion may maintain a dimensionalized geometry that creates the protrusion portion 110 extending beyond a plane generally defined by the bottom surface 104. However, when the thermal energy exceeds the programmed shape activating temperature, the reactive structure 112 may react and a hinge portion 118 may invert causing the protrusion portion to extend above the top surface 106. In this example, the hinge portion 118 adjusts a plane in which the protrusion portion 110 extends above or below a flange portion 114 and a central portion 116. As will be discussed in greater detail hereinafter, it is contemplated that a greater dimensional offset difference between extreme planes of the reactive materials portion 100 exists at a lower temperature (e.g., to form a greater loft-like insulative characteristic) than the dimensional offset that exists at a higher temperature (e.g., to reduce the insulation characteristics). Stated differently, as a wearer's body temperature increases, the dynamic material reacts to reduce the insulation characteristics of the article to facilitate better cooling of the wearer.

In an alternative aspect, it is contemplated that when the temperature applied to the reactive structure exceeds the programmed memory temperature, the base material 102 is allowed to flatten which reduces an amount of compressive force previously applied by the base material 102 to the wearer because of the realization of additional materials that were traditionally used in a z-direction (e.g., protrusion portion 110). Regardless of the resulting reactionary change, a manipulation of the environment created, in part, by the base material 102 is caused. For example, adjusting the portions of the material again the wearer's body, the tightness of the fit, and other mechanical changes may allow for more ventilation/permeability to cool the wearer.

Figure 2:
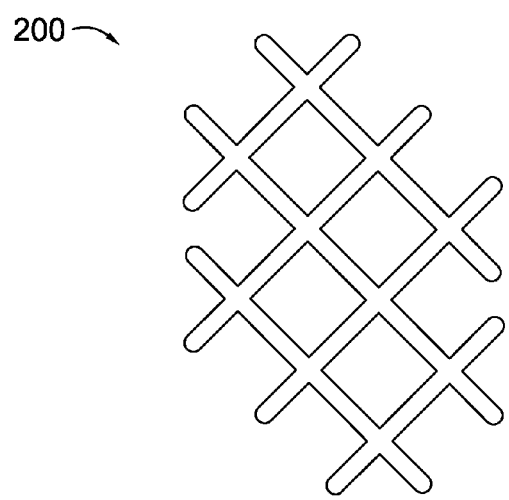
FIG. 2 depicts an exemplary reactive structure, in accordance with aspects of the present invention.
Figure 3:
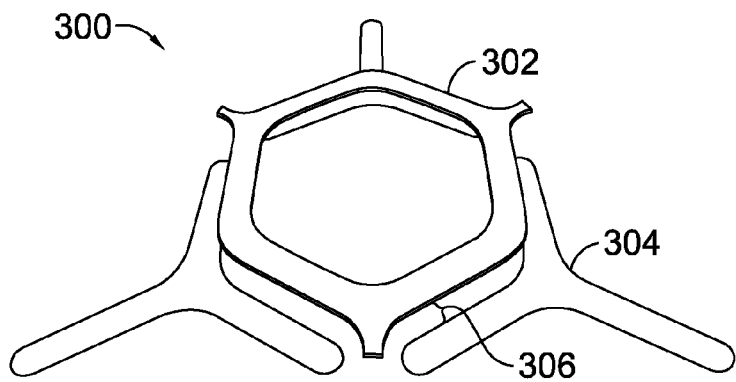
FIGS. 3-7 depict an exemplary construction in an active state utilizing a reactive structure and a non-reactive structure, in accordance with aspects of the present invention.

FIG. 2 depicts an exemplary reactive structure 200, in accordance with aspects of the present invention. The reactive structure 200 may be implemented in a manner previously discussed with respect to FIG. 1 hereinabove. For example, the reactive structure 200 may be a printed structure that is printed directly onto a base material or onto a transfer material to be applied more like a laminate-like structure. Further, it is contemplated that the reactive structure 200 may be formed from a film-like material. The reactive structure 200 may be laser cut, die cut, knife cut, or any other technique for extracting a desired form from a sheet material.

The reactive structure 200 is formed as an exemplary lattice structure. However, it is contemplated that the uniformity depicted in FIG. 2 is exemplary in nature only. Gradients, zoned, and organic sizing, shaping, and orienting of the members and voids forming the lattice are contemplated. Therefore, any type of structure is contemplated as being formed to accomplish the functional aspects provided herein. Further, it is contemplated that a lattice like structure may provide ventilation/permeability and flexibility for use in connection with exemplary articles.

FIGS. 3-7 depict an exemplary construction in an active state 300 utilizing a reactive structure 302 and a non-reactive structure 304, in accordance with aspects of the present invention. When in an activated state, the reactive structure 302 may expand but the non-reactive structure 304 inhibits expansion in an X-Y plane causing the expansion into a Z direction. The expansion in the Z direction generates an offset 306 between the reactive structure 302 and the non-reactive structure 304. The offset 306 represents a measurement of a "bubbling" like effect as the reactive structure 302 expands away from the X-Y plane in which the non-reactive structure 304 is contained. Consequently, the non-reactive structure 304 may serve as a cage-like structure preventing movement of the reactive structure 302 in the X-Y plane.

In an exemplary aspect, it is contemplated that the non-reactive structure 304 is a dimensionally-stable non-stretch material that is printed or laminated onto an article (or material forming the article). The reactive portion 302 is contemplated as a dielectric elastomer actuator acting in a circuit-like manner. However, it is contemplated that the reactive structure 302 may also be an SMP material having a programmed shape that is larger when activated than when not activated.

The activation of the reactive structure 302 may create a dimensional geometry in the Z direction that results in one or more volumes useable for trapping air or pulling an underlying base material away from the wearer, in an exemplary aspect.

Figure 4:
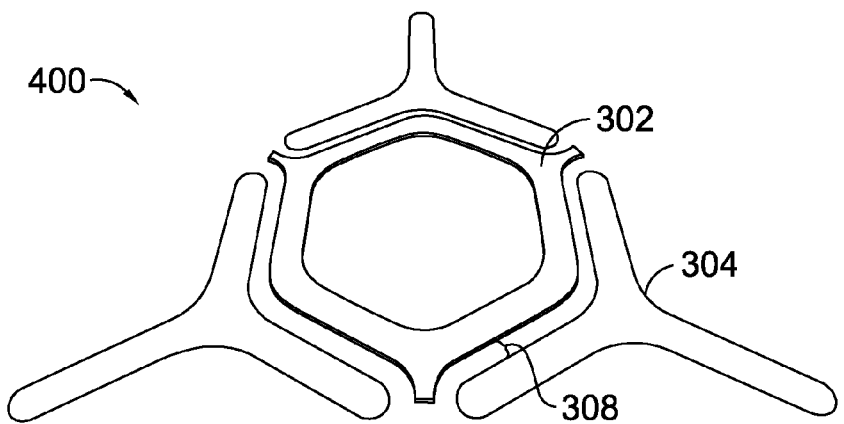

FIG. 4 depicts a construction in a non-activated state 400 utilizing the reactive structure 302 and the non-reactive structure 304, in accordance with aspects of the present invention. When not activated, the reactive structure 302 may maintain a geometric configuration that is substantially within an X-Y plane of the non-reactant structure 304. Consequently, an offset 308 may be minimal in a Z plane between the reactive structure 302 and the non-reactant structure 304.

Figure 5:
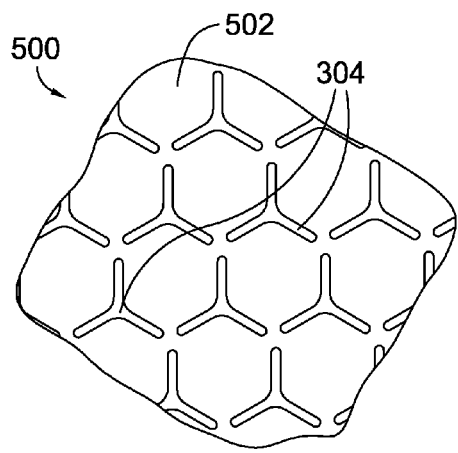

FIG. 5 depicts an arrangement 500 of the non-reactive structure 304 arranged on a base material 502, in accordance with aspects of the present invention. While a specific geographic orientation is illustrated, it is contemplated that the non-reactive structure 304 may be of any size and/or shape.

Figure 6:
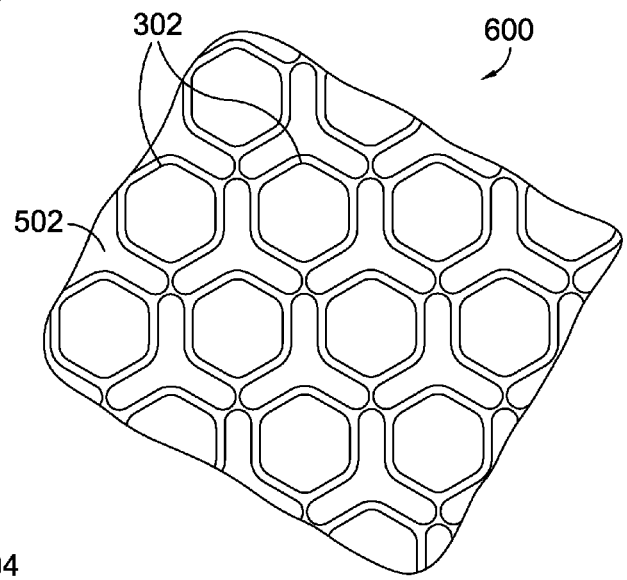

FIG. 6 depicts an arrangement 600 of the reactive structure 302 arranged on the base material 502, in accordance with aspects of the present invention. While a specific geographic orientation is illustrated, it is contemplated that the reactive structure 302 may be of any size and/or shape.

Figure 7:
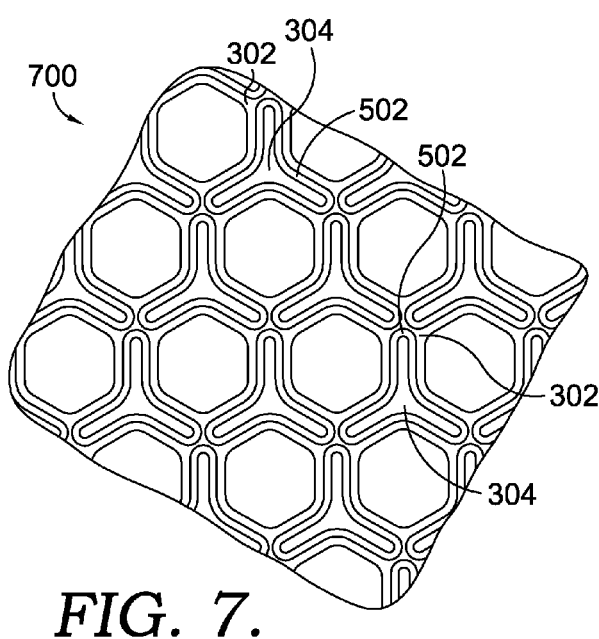

FIG. 7 depicts an arrangement 700 of the reactive structure 302 and the non-reactive structure 304 on the base material 502, in accordance with aspects of the present invention. As depicted, the reactive structure 302 is a continuous circuit-like geometry allowing for an electrically activated elastomer to form a complete circuit, in an exemplary aspect. However, it is contemplated that additional structures may be implemented depending on a number of factors and considerations. For example, when differing materials, such as SMP materials, are utilized, the continuous nature may not be necessary, in an exemplary aspect. Further, depending on desired zoning and or flexibility, it may be advantageous to terminate one or more portions of the reactive and/or non-reactive structures 302 and 304 respectively.

Figure 8:
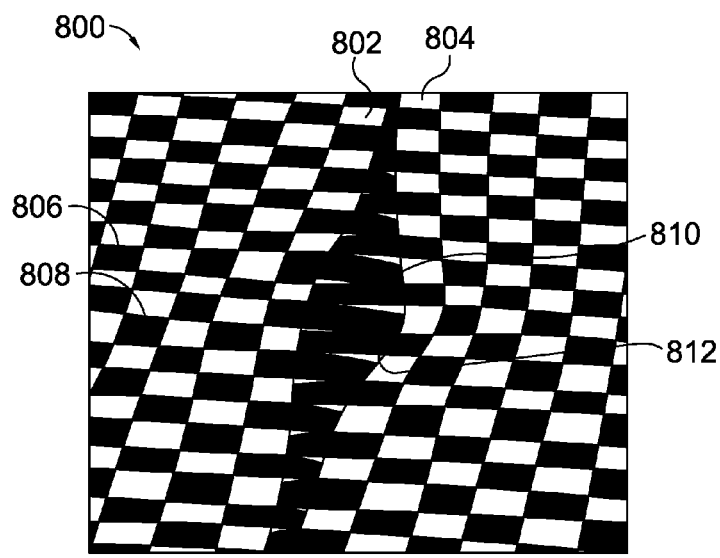
FIG. 8 depicts a dynamic material incorporated into a woven material having a plurality of wefts and warps, in accordance with aspects of the present invention.

FIG. 8 depicts a woven material 800 having a plurality of wefts and warps, in accordance with aspects of the present invention. Warps 802 and 804 and wefts 806 and 808 are exemplary in nature. It is contemplated that those elements identified as warps and wefts may be switched in an aspect of the present invention.

It is contemplated that one or more wefts and/or one or more warps are formed with a SMP material, at least in part. For example, a fiber material application and/or a yarn material application may be implemented in exemplary aspects of the present invention. In the present example, the warps 802 and 804 are formed from a SMP material while the wefts 806 and 808 may be formed from non-SMP materials. However, it is also contemplated that the wefts 806 and 808 are also or in the alternative formed with SMP materials.

A deformation within the woven material 800 is contemplated as occurring as a result of a dynamic material reacting to an applied stimulus. The deformation may include a "loosening" of the weave in selected locations, such as deformation 810 that generates a void 812. The deformation 810, in this example, is formed by the warps 802 and the 804 reacting to a stimulus to return to a programmed shape that non-linear in an opposing direction from one another. As the warps 802 and 804 return to a programmed shape, they separate from one another forming the deformation 810.

Applied as the yarn material application level may allow for the natural movement of the woven material 800 to move at the warp and weft layers to aid in those warps/wefts trying to form into a programmed shape by "shaking" out the material to relieve resistance created by the warps and wefts interacting with each other. Therefore, when the woven material 800 moves, the warp 802 may move relative to the wefts 806 allowing the warp 802 to return to a programmed shape with less resistance provided by the weft 806.

It is contemplated that when an activating stimulus is removed that the woven material 800 returns back to a more traditional X/Y woven configuration that is substantially orthogonal to one another. Again, the movement of the woven material may facilitate an easier return to a traditional woven configuration by reducing resistance to warp/weft movement. Further, it is contemplated that a material is selected for the warps/wefts that reduces resistance to movement to also aid in returning to or returning from a programmed shape.

Figure 9:
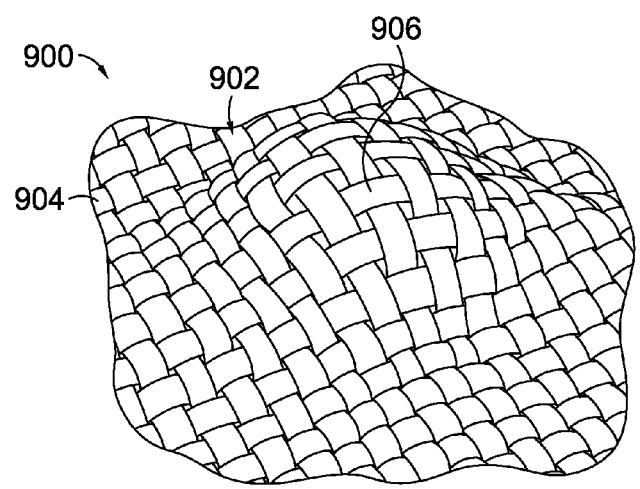
FIG. 9 depicts a woven material having a programmed deformation, in accordance with aspects of the present invention.

FIG. 9 depicts a woven material 900 having a programmed deformation 906, in accordance with aspects of the present invention. The deformation 906 is a protrusion-like structure that extends outwardly from a surface of the woven material 900. It is contemplated that both warps and wefts of the woven material 900 are formed, at least in part with a dynamic material. For example a warp 902 and a weft 904, in this example, are formed with a dynamic material. The woven material 900 is programmed to form the deformation 906 when a particular stimulus (or intensity of the stimulus) is applied, in an exemplary aspect. While the deformation 906 is depicted as a general protrusion, it is contemplated that the any geometric configuration may be implemented. For example, a wave-like structure may be programmed that provides a corrugated-like effect that increases a volume of air next to a wearer.

FIGS. 10A-10C depict variable apertures in a selected portion 1000 of a garment, in accordance with aspects of the present invention. The portion 1000 is comprised of multiple aperture zones. A first aperture zone 1002, a second aperture zone 1004, and a third aperture zone 1006 are illustrated.

A variable aperture is on that reacts to a provided stimulus causing a change in an area (e.g., diameter of a circular aperture) of the aperture. Therefore, a variable aperture may be utilized as a venting structure that provides larger venting apertures in response to increased thermal energy associated with the wearer (or any source). The variable aperture size may be accomplished through a printing of an aperture perimeter that is programmed to have varied perimeter sizes based on stimulus. The apertures may be varied at a fiber/yarn level that adjusts the aperture through a manipulation of radial fibers forming the aperture perimeter. Further, it is contemplated that the apertures may be formed, at least in part, with a laminate formed from a dynamic material. For example, a zone (e.g., first aperture zone 1002) may be a laminate portion having a plurality of apertures formed therein such that the zone is then applied to a portion of the garment. The applied zone therefore may be customized for a level of aperture size, shape, and reactionary criteria.

In FIG. 10a the first aperture zone 1002, the second aperture zone 1004, and the third aperture zone 1006 are all comprised of a plurality of apertures 1008 having a first size. FIG. 10B depicts the first aperture zone 1002 having a plurality of apertures 1010 having a second size and the second aperture zone 1004 maintaining the plurality of apertures at the first size. In this example, it is contemplated that the apertures in zone 1002 are formed with an SMP having a different programmed shape temperature than those apertures in the second aperture zone 1004. Therefore, when a temperature increases enough to cause a reaction in the SMP of the first aperture zone 1002, the temperature is not sufficient to also affect the apertures in the second aperture zone. This differential in activation provides a zonal option for adjusting a level of permeability in particular areas with varied stimulation levels.

FIG. 10c depicts both the first aperture zone 1002 and the second aperture zone 1004 comprised of a plurality of apertures 1012 having a third size. In this example, the apertures of the first aperture zone 1002 may be formed from a three-stage dynamic material that is able to have at least two different programmed shapes. The dynamic material utilized in the second aperture zone 1004 may be formed of as a two-stage dynamic material that is able to learn only a single shape. Alternatively, it is contemplated that the apertures in the second aperture zone 1004 may have yet another size they are functional to achieve at a higher level of stimulation.

As previously discussed, it is contemplated that any type of stimulation may be utilized to activate one or more shape memory materials. For example, while thermal energy was discussed with respect to FIGS. 10A-10C, it is contemplated that moisture or light may also provide a stimulation to which a shape memory material reacts.

FIGS. 11A-12B depicts exemplary electrically activated polymers (EAP) (another exemplary dynamic material) that may be utilized in one or more aspects contemplated herein. In general, it is contemplated that when an electrical current is applied to a material having a core forming a first electrode and to an outer surface forming a second electrode, a displaceable mass sandwiched between the electrodes may be displayed in a desired direction adjusting a resulting shape. For example, it is contemplated that a silicone-like substance may be sandwiched around a conductive core and an external surface. When an electrical current is applied to the core and outer surface, an attractive force is generated that attracts the outer surface towards the core resulting in the sandwiched silicone mass to be displaced in an elongated manner, resulting in a "growth" of the materials in a defined direction.

Figure 11A:
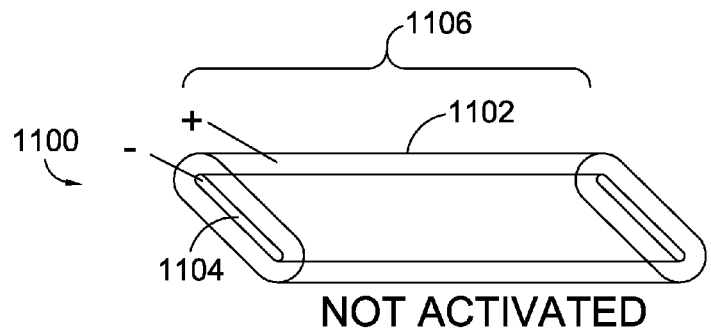
FIGS. 11A-12B depicts exemplary electrically activated polymers (EAP) that may be utilized in one or more aspects contemplated herein.
Figure 11B:
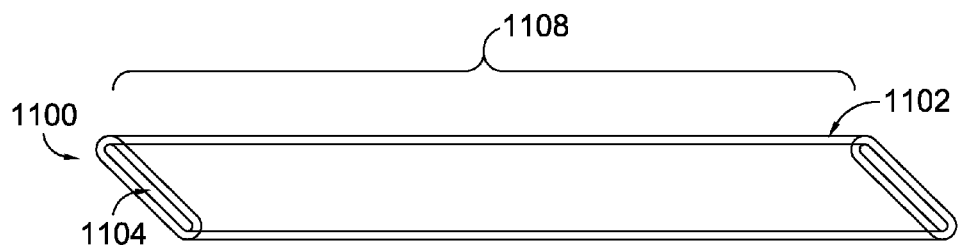

FIGS. 11A and 11B depicts a ribbon 1100 of EAP having an outer electrically conductive surface 1102 and an electrically conductive core 1104. When in a non-activated state, the ribbon 1100 has a length of 1106. However, when in activated state, as depicted in FIG. 11B, the ribbon elongates to have a length equivalent to length 1108. It is contemplated that the ribbon 1100 may be formed in a variety of manners. For example a multi-material extrusion is contemplated.

Figure 12A:
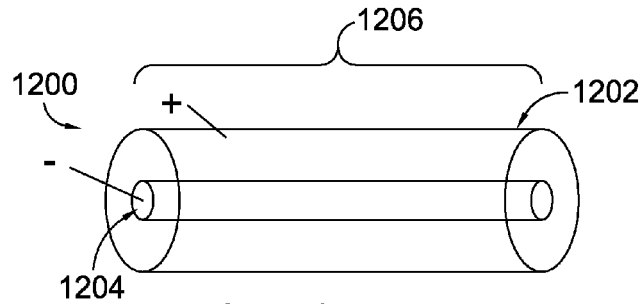
Figure 12B:
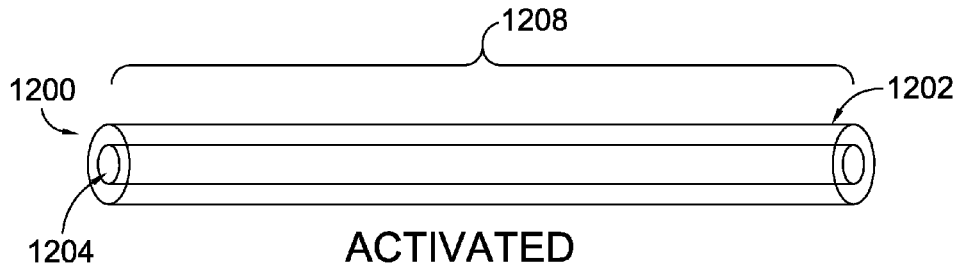

Similar to FIGS. 11A-11B, FIGS. 12A-12B depict an EAP structure that is a cylinder 1200. The cylinder 1200 is comprised of an outer surface 1202 and an inner core 1204 and has a length 1206 in a non-activated state. However, when activated, the length of the cylinder 1200 expands to a length 1208, as depicted in FIG. 12B.

It is contemplated that the ribbon 1100 and the cylinder 1200 may be used as trim-like pieces, automatic lacing, haptic feedback devices, and the like. Further, it is contemplated that about a 30% elongation is possible in one or more aspects utilizing an EAP.

Figure 13:
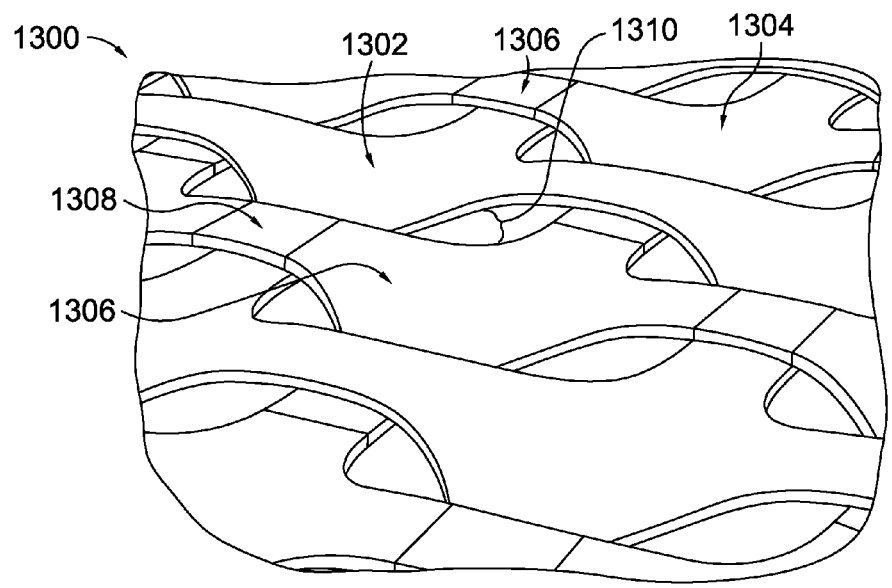
FIG. 13 depicts a shape changing structure that fills interstitial voids in response to an applied stimulus, in accordance with aspects of the present invention.

FIG. 13 depicts a shape changing structure 1300 that fills interstitial voids in response to an applied stimulus, in accordance with aspects of the present invention. The structure 1300 is comprised of two primary forms. The first form is a non-reactive framework 1302. The second is a reactive framework 1304. When a stimulus is applied, the reactive frame work expands. The expansion of the reactive framework fills an interstitial void 1310 between the first framework 1302 and the second framework 1304. In an exemplary aspect, the second framework 1304 is formed with an EAP portion 1308 and a conductive link portion 1306. The conductive link portion 1306 facilitates the transmission of electrical current between two of the EAP portions 1308. Additionally, it is contemplated that the first or second frameworks 1302 and 1304 respectively may be formed from a SMP.

Figure 14:
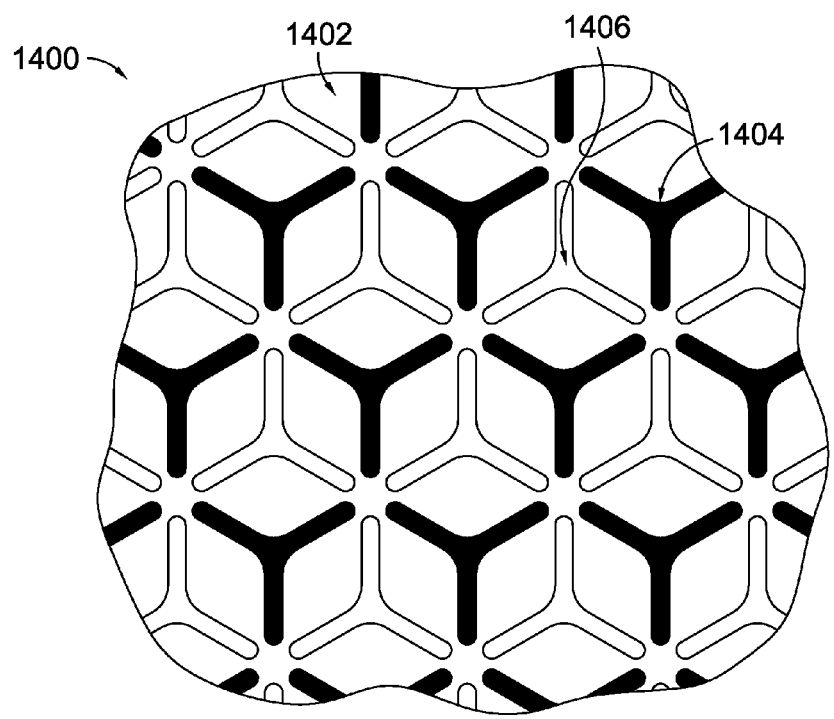
FIG. 14 depicts a planar view of a geometric material, in accordance with aspects of the present invention.

FIG. 14 depicts a planar view of a geometric material 1400 forming an auxetic structure, in accordance with aspects of the present invention. The planar material 1400 is formed with a base material 1402 onto which a first side is applied SMP members 1404 and onto the opposite side SMP members 1406. Stated differently, the SMP members 1404 are printed or otherwise applied to a top surface of the base material 1402 and the SMP members 1406 are printed or otherwise applied to a bottom surface of the base material 1402. The SMP members 1404 are programmed to extend in a first direction (away from the opposing SMP members 1406) and the SMP member 1406 are programmed to extend in a second direction (away from the opposing SMP member 1404), as depicted in FIG. 15.

Figure 15:
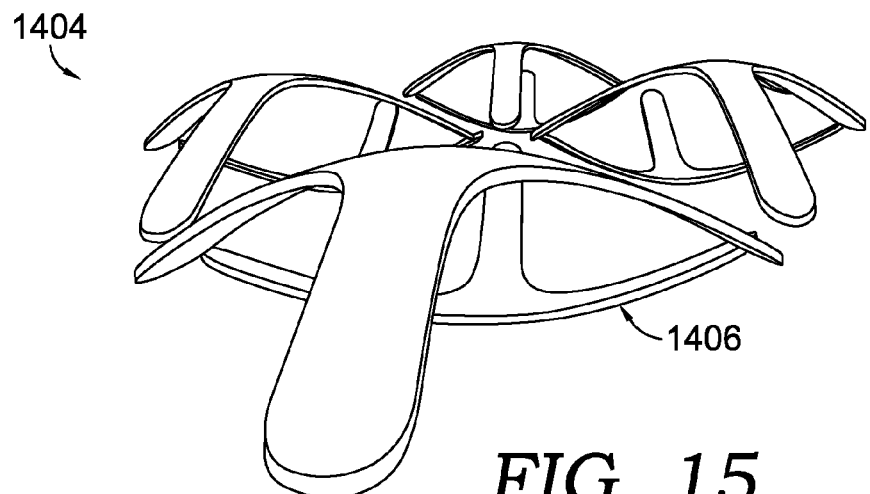
FIG. 15 depicts a perspective view of the shape memory polymer members of FIG. 14 extending in a first direction and the other shape memory polymer members extending in an opposite direction, in accordance with aspects of the present invention.

FIG. 15 depicts a perspective view of the SMP members 1404 extending in a first direction and the SMP members 1406 extending in an opposite direction, in accordance with aspects of the present invention. This arrangement forms a dimensionalized textile that is reactive to one or more stimuli. While SMP materials are described, it is also contemplated that the SMP members 1404 and/or 1406 may be a magnetic responsive material as well or in the alternative. Alternative arrangements, shapes, sizes, and programmed shapes of the SMP members 1404 and 1406 are contemplated.

As previously discussed, it is contemplated that achieve the dimensionalized textile illustrated in FIG. 15, the textile having the SMP members 1404 and 1406 coupled thereon is inserted into a mold that is aligned to the positioning of the SMP member 1404 and 1406 such that a proper upward or downward form is associated with the SMP members. Once positioned, it is contemplated that the mold itself or and external source applies the appropriate energy (e.g., thermal, lights) that allows for the SMP members 1404 and 1406 to be programmed in the shape provided by the mold.

Figure 16:
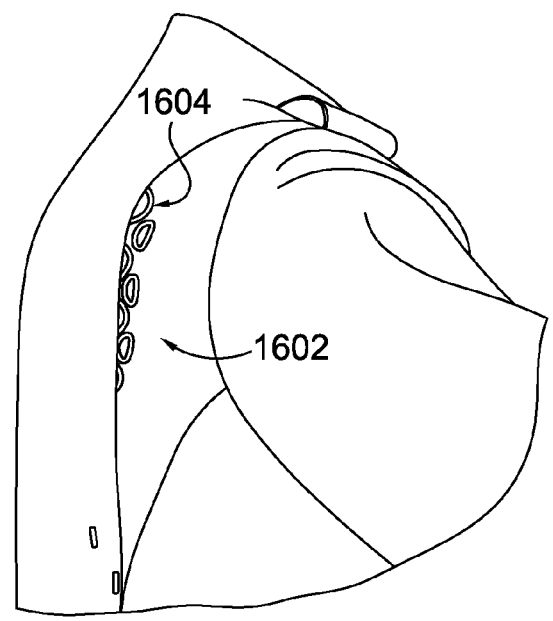
FIGS. 16-19B depict a reflex vent concept that utilizes dynamic materials to open and close a vent structure incorporated into an article, in accordance with aspects of the present invention.

FIGS. 16-19B depict a reflex vent concept that utilizes shape memory materials to open and close a vent structure incorporated into an article, in accordance with aspects of the present invention. In particular, FIG. 16 depicts an article, such as a jacket 1600, in which a reflex vent 1602 is incorporated in a rear shoulder region. In response to stimulus, such as thermal energy or moisture, the reflex vent 1602 opens or closes to expose or conceal one or more apertures 1604. As the reflex vent 1602 exposes the apertures 1604, air movement from a first side to an opposite second side of the jacket 1600 is allowed. As with other traditional venting methods, the movement of airflow facilitates regulating temperature inside the article. Further, it is contemplated that the reflex vent 1602 may be responsive to moisture, such as rain, allowing for the vent to close in the presence of rain. The closing of the reflex vent 1602 shields the apertures 1604 from the external moisture and limits that entry of the moisture into an interior portion of the jacket 1600. While a jacket 1600 is depicted, it is contemplated that a reflex vent may be incorporated into any article.

Figure 17:
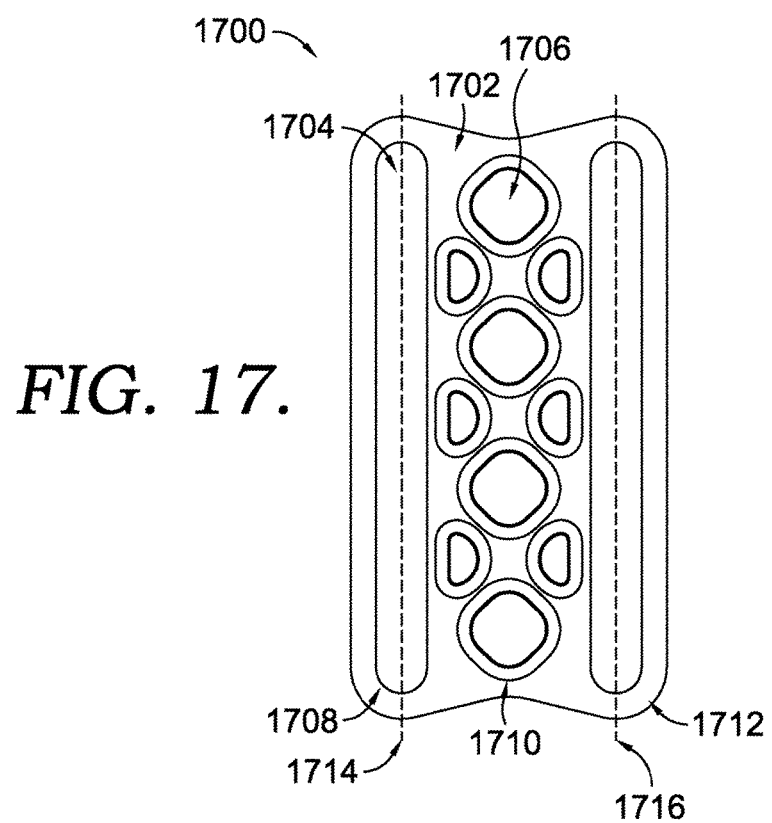

FIG. 17 depicts a vent assembly 1700, in accordance with aspects of the present invention. The vent assembly 1700 may be incorporated into the jacket 1600 of FIG. 16 discussed previously, in an exemplary aspect. The vent 1700 is comprised of a body portion 1702. The body portion 1702 may be a heat transfer material that allows the vent 1700 to be bonded to an article with heat and/or pressure. It is contemplated that the bonding of the body portion 1702 to the article may be done at a temperature sufficient to teach SMP materials a desired shape.

The vent 1700 is further comprised of SMP hinge portions 1704. The hinge portions 1704 are located at a fold lines 1714 and 1716. The fold lines separate a venting portion 1710 from flange portions 1708 and 1712. Upon activation by a stimulus, each of the hinge portions 1704 attempt to go from a creased overlapping state (e.g., folded) to a common planar state (e.g., flat), which exposes the venting portion 1710 to an external environment for venting purposes.

Figure 18:
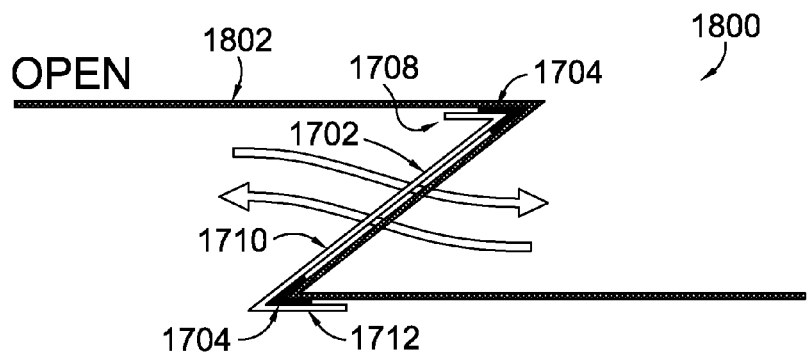

FIG. 18 depicts an open state of a vent 1800 incorporated into an article, in accordance with aspects of the present invention. The vent 1800 is comprised of the body portion 1702, hinge portions 1704, flange portions 1708 and 1712, and vent portion 1710, all previously discussed with respect to FIG. 17. In this side perspective view, the vent assembly is coupled with a portion 1802 of an article. It is contemplated that the portion 1802 is a panel on an article of clothing, but it is also contemplated that the portion 1802 may be a portion of any article. The open nature of the vent assembly allows a great volume of air to flow from a first side of the portion 1802 to another side of the portion 1802. While not depicted, it is contemplated that a plurality of apertures extends through the portion 1802 in positions aligned with apertures within the vent portion 1710.

Figure 19A:
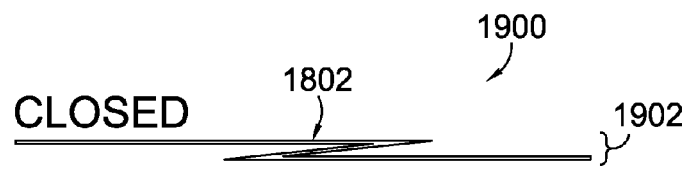
Figure 19B:
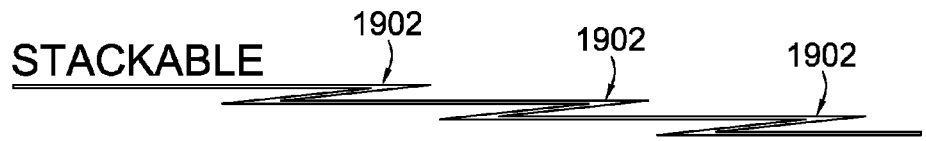

FIG. 19A depicts a vent assembly 1902 in a closed position, in accordance with aspects of the present invention. In this simplified side perspective, the vent assembly is close by way of hinge portions in a creased state causing flange portions and associated portions 1802 to overlap a vent portion. FIG. 19B shows a series of stacked vent assemblies 1902 demonstrating that two or more vent assemblies may be utilized in concert to achieve a desired permeability (e.g., transfer of air and/or moisture) characteristic.

Dimensional Structures

Dynamic materials may be implemented to form dimensional structures (e.g., FIGS. 1-9 and 13-14) that are responsive to one or more stimuli. A dimensional structure may be the formation of volume effective for affecting the movement of air and/or moisture. For example, a dynamic material may be used to change the loft (i.e., insulative capacity) of an article in response to thermal energy. In this example, it is contemplated that as a user of an article (e.g., shirt, pant, undergarment, outerwear) begins to have an elevated body temperature resulting from increased activity (e.g., participation in an athletic endeavor), the article reduces the insulative ability in one or more portions based on a mechanical response by a dynamic material responding the increase in thermal energy output by the wearer. Similarly, it is contemplated that as external thermal energy (or any other stimuli) changes, the article adapts to those changes (e.g., as the ambient temperature drops, the dynamic material causes the article to increase the loft to increase an insulation factor). Additional examples of dimensional structures are provided herein; however, it is contemplated that additional aspects and derivatives of those aspects provided herein are also potential implementations to achieve a dynamic dimensional material having dynamic materials integrated therein.

A dimensional structure may incorporate and/or leverage an auxetic structure to achieve one or more desired characteristics. An auxetic structure is a structure that has a negative Poisson's ratio. When a structure has a negative Poisson's ratio, a positive strain in a longitudinal axis of the structure results in the transverse strain in the material also being positive (i.e. it would increase the cross sectional area). Stated differently, an auxetic structure increases in size at a direction that is perpendicular to an applied stretch force, which is contrary to a material having a positive Poisson's ratio that thins in the cross sectional direction when stretched in the longitudinal direction. Some of the dimensional structure provided herein achieves a negative Poisson's ratio through the unique geometry and orientation of the dynamic materials. This created auxetic structure from dynamic materials alone or in combination with an underlying carrier material allows a longitudinal expansion or contraction of the dynamic material to result in a similar expansion/contraction in a perpendicular direction of the article. For example, as the dynamic material expand in a first direction of the article, the article may also expand in at least one more direction perpendicular to the first direction (e.g., width or thickness). While auxetic structures are described and depicted herein, aspects of the invention are not limited to auxetic structures. It is contemplated that structures having a positive Poisson's ratio may be implemented in aspects of the present invention.

The concept of an auxetic structure allows for an article to be formed that is able to form to the natural curves and shaped of an organic object, such as a wearer while maintaining structural aspects. For example, a joint region (e.g., knee, shoulder, and elbow) of a wearer experiences a wide variety of orientation and positional changes for which a form-fitting structure that also provide structure aspects is desired. The structural aspects may facilitate dynamic altering a lift off from the wearer's body, generating loft, or other thermal regulating functions. Further, while "dimensionality" will be discussed as achieving change in the Z-direction, the auxetic structure is contemplated as operating with a negative Poisson's ration in at least the X and Y direction of the material, in an exemplary aspect.

Figure 20:
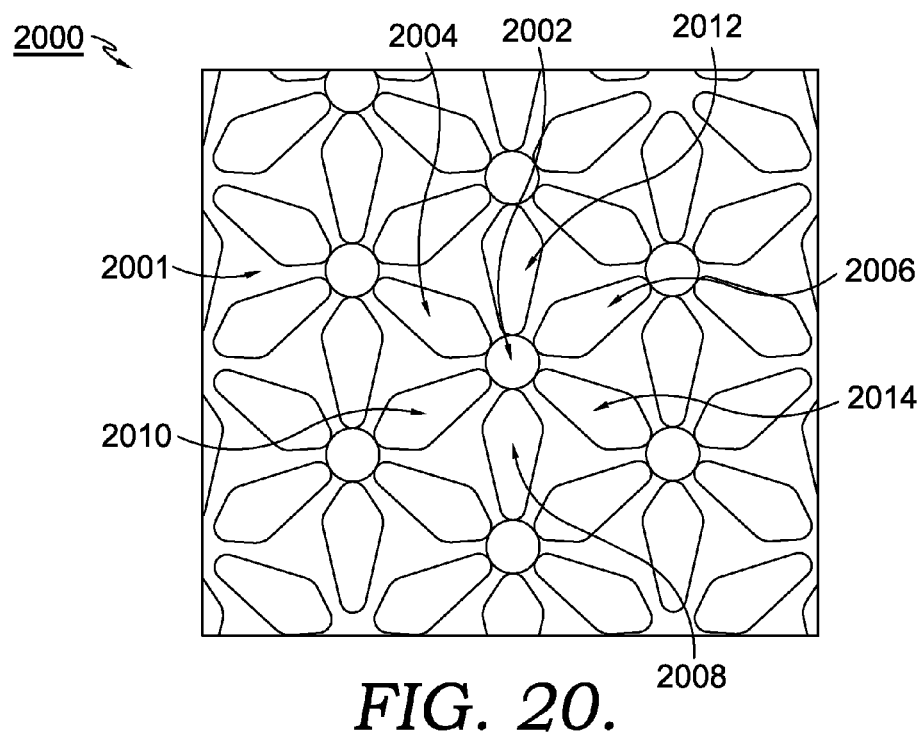
FIG. 20 depicts an exemplary auxetic structure of shaped and oriented dynamic material portions on a carrier material, in accordance with aspects of the present invention.

FIG. 20 depicts an exemplary auxetic structure 2000 of shaped and oriented dynamic material portions on a carrier material 2001, in accordance with aspects of the present invention. The dynamic material, as previously discussed above may be a shape memory polymer (e.g., a composite of an SMP and a biasing material). In this example, a common form of a dynamic material is oriented in a specific pattern on the carrier material 2001. For example, a radial pattern may be identified about a circular area 2002 comprised of portions 2004, 2006, and 2008 in a first relative orientation to the circular area 2002 and portions 210, 212, and 214 in an opposite second relative orientation to the circular area 2002. The portions 2004, 2006, and 2008 will be referred to as lesser oriented while the portions 2010, 2012, and 2014 will be referred to as greater oriented to the circular area 2002. The greater oriented is derived from a longitudinal length of the portion that extends from a bisecting line of the portion that extends between inflection points of two sides. Stated differently, the lesser oriented portions are those that have the shorter end of the portion proximate to the circular area 2002 where the shorter end is defined as extending from a perpendicular line extending between the widest width of the portion to an end on a lengthwise axis of the portion. The greater oriented portions have a greater length measured from the perpendicular line extending between the widest widths of the portion to an end on the lengthwise axis of the portion.

The auxetic structure 2000 implements an alternating sequence of greater oriented portions and lesser oriented portions about the circular area 2002. While the circular area 2002 is depicted in FIG. 20, it is merely depicted for illustrative purposes in this example. As will be discussed in FIGS. 21-24 hereinafter, the auxetic structure 2000 comprised of the portions 2004, 2006, 2008, 2010, 2012, and 2014 causes a dimensional change to the underlying carrier material 2001 that results in a dimensional material in a Z-direction relative to the depicted X-Y plane of FIG. 20. This Z-direction change may be used to affect the insulation value of an associated article to increase the insulation qualities with a reduction in temperature and a decrease in insulation qualities with an increase in temperature.

Figure 21:
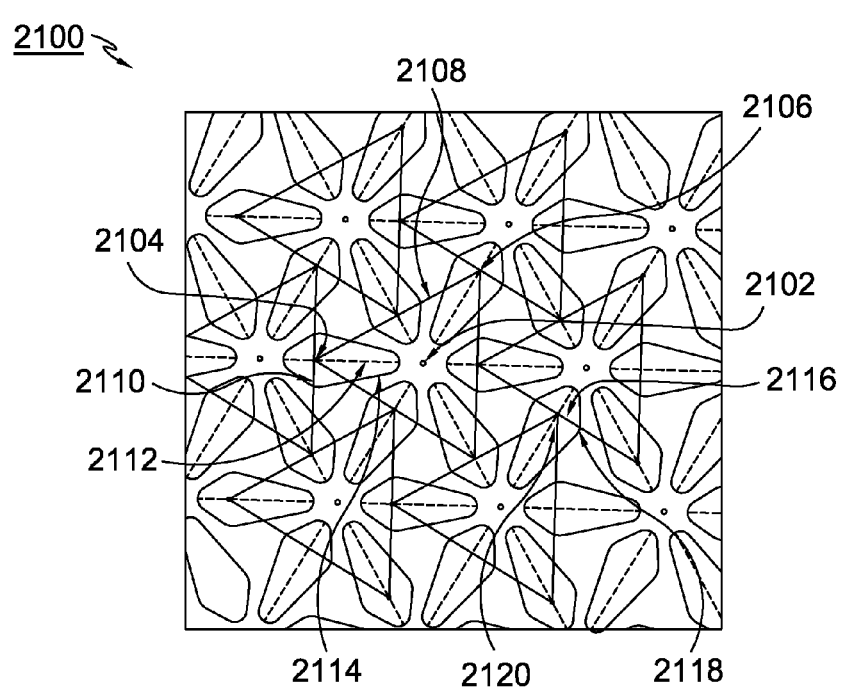
FIG. 21 depicts an auxetic structure having positioning lines relative to a pattern similar to the auxetic structure discussed in FIG. 20 to illustrate the orientation and placement of dynamic material portions relative to one another in order to accomplish a desired Z-direction change in response to a stimulus, in accordance with aspects of the present invention.

FIG. 21 depicts an auxetic structure 2100 having positioning lines relative to a pattern similar to auxetic structure 2000 discussed in FIG. 20 to illustrate the orientation and placement of portions relative to one another to accomplish a desired Z-direction change in response to a stimulus, in accordance with aspects of the present invention.

For example, longitudinal axis of portions radially oriented about a point 2102 intersects the point 2102. An exemplary longitudinal axis 2112 is depicted for a portion 2114. A segment 2110 that is perpendicular to the longitudinal axis 2112 is also depicted extending between the widest widths of the portion 2114. As discussed with respect to FIG. 20, the lesser orientation and the greater orientation of the portions is determined based on a length along the longitudinal axis as it extends from the segment 2110 to an end of the portion 2114. A point 2104 is defined at the intersection of the longitudinal axis 2112 and the segment 2110. The point 2104 may be referred to as a vertex point as this point for each of the greater oriented portions may be connected to form an equilateral triangle, in this example. For example, vertices 2104 and 2106 are connected by a segment 2108. The segment 2108 forms a side of an equilateral triangle that defines, in part, the functional pattern of the portions relative to one another.

The segments that extend between vertices points also form the segment lines defining the widest width of the lesser oriented portions. Therefore, each side of the triangular segments perpendicular intersect the longitudinal axis of the lesser oriented portions radially oriented about a common center point. This intersection by a triangular segment is illustrated with segment 2116, which intersects a longitudinal axis of a portion 2118 at a point 2120. The segment 2116 demarks the widest width of the portion 2118 as it passed through the portion 2118. As will be discussed in greater detail in FIG. 22 hereinafter, it is this midpoint of the triangular segment, such as point 2120, that defines a hinge function to create dimensional change and facilitate the auxetic nature of the resulting structure.

It should be understood that the various points and line segments depicted in FIG. 21 are provided to illustrate the unique orientation and pattern formed to achieve aspects of the present invention. These points and line segments may not be visible on an actual article, but instead provided herein to aid in understanding the unique relationship of the various portions.

Figure 22:
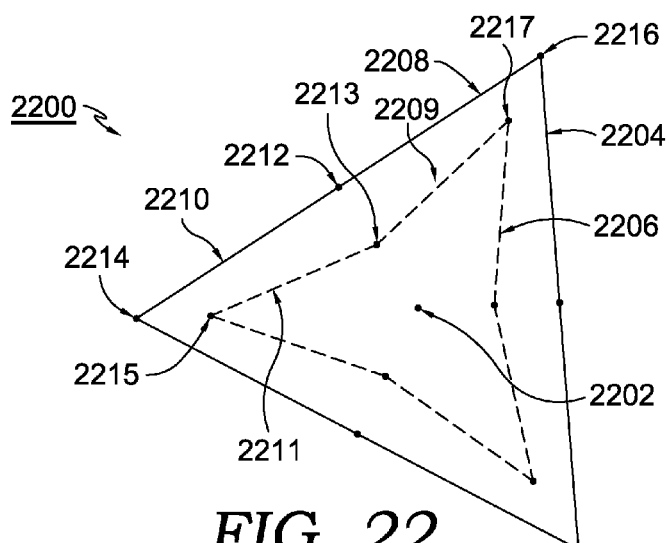
FIG. 22 depicts an exemplary relationship triangle that describes the relationship of dynamic material portions in an auxetic structure in a first state and in a second state, in accordance with aspects of the present invention.

FIG. 22 depicts an exemplary relationship triangle 2200 that could describe the relationship of portions in an auxetic structure in a first state 2204 represented by the solid lines and in a second state 2206 as represented by the dashed lines, in accordance with aspects of the present invention. The relationship triangle could be implemented with respect to the portions depicted in FIGS. 20, 21, and 23-27, in exemplary aspects. The first state 2204 of the relationship triangle may result in a minimal Z-direction dimensionality of the underlying article compared to the second state of the relationship triangle, which would have a greater Z-direction dimensionality, in an exemplary aspect.

The change from a first state 2204 to a second state 2206 in the relationship triangle may be a result of the dynamic material portions located at the vertices and the midpoints of the relationship triangle. For example, the dynamic materials may form a dimensioned shape (e.g., such as those depicted in FIGS. 31-36 hereinafter) relying on complex spatial curves that form a structural element from an otherwise substantially planar material.

The first state of the relationship triangle 2204 is depicted in solid lines. For example, two vertices points, 2214 and 2216, have a segment extending between them that is divided into a first segment portion 2208 and a second segment portion 2210 separated by a midpoint 2212. In the first state, the segment portions 2208 and 2210 are in a substantially parallel relationship to form a seemingly linear segment between vertices 2214 and 2216. The first state 2204 and the second state 2206 share a common center point 2202, in this example.

In the second state 2206 represented by the dashed lines, a change in shape of dynamic materials located at the vertices and midpoints distorts the relationship triangle such that the vertices and midpoints are in a different spatial relationship. For example, a vertex 2215 in the second state is the vertex 2214 in the first state. A midpoint 2213 and vertex 2217 is the midpoint 2212 and the vertex 2216 in the second state, respectively. A segment 2211 extends between the vertex 2215 and the midpoint 2213 and a segment 2209 extends between the vertex 2217 and the midpoint 2213. The segment 221 and the segment 2209 are not in a substantially parallel relationship, and therefore, do not form a linear segment between the vertex 2215 and 2217. It is this change in location of the vertices and midpoints depicted by the first state 2204 relationship triangle and the second state 2206 relationship triangle that is realized during the change of the dynamic materials.

Figure 23:
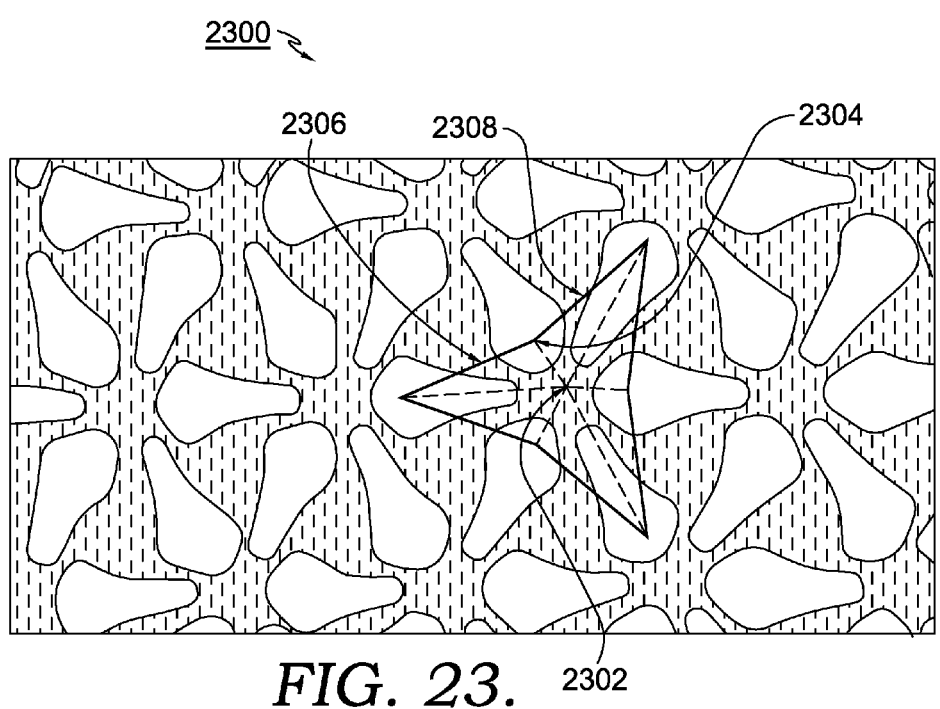
FIG. 23 depicts an auxetic structure in a dimensioned state formed from dynamic material portions and a carrier material, in accordance with aspects of the present invention.

FIG. 23 depicts an auxetic structure 2300 in a dimensioned state (e.g., second state from FIG. 22) formed from dynamic material portions and a carrier material, in accordance with aspects of the present invention. The dynamic material, in this example, is in a shape that alters the exemplary relationship triangle proportions between the dynamic materials portions such that a segment 2306 and a segment 2308 diverge from a parallel relationship at a midpoint 2304. This dimensioned state is further depicted in FIG. 24 hereinafter to show the formed facets that are partially defined by the axial elements extending from a center point 2302.

Figure 24:
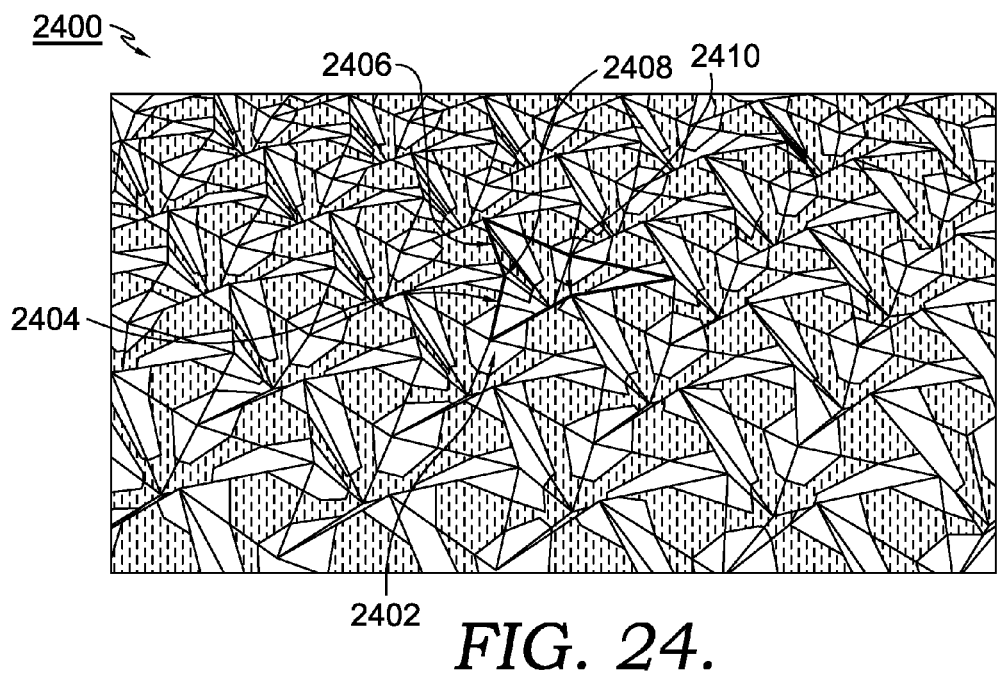
FIG. 24 depicts an auxetic structure in a dimensioned state that is similar to those structures discussed in FIGS. 20, 21, and 23, in accordance with aspects of the present invention.

FIG. 24 depicts an auxetic structure 2400 in a dimensioned state that is similar to those structures discussed in FIGS. 20, 21, and 23, in accordance with aspects of the present invention. In this example, a Z-direction dimensionality extends in a negative direction, which is away from a viewing perspective plane of FIG. 24. Stated differently, the dimensionality formed in FIG. 24 extends into the plane on which FIG. 24 is illustrated (e.g., downwardly). However, it is contemplated that the dimensionality may extend upwardly as well or in the alternative.

FIG. 24 depicts a number of dynamic material portions in a non-planar orientation, such as a portion 2402, positioned on a carrier material, such as a textile or other portion of an article, in accordance with aspects of the present invention. The dynamic material portions may form a complex curve (e.g., a convex curved intersection with a concave curve) as will be discussed in greater detail in FIGS. 31-36. As illustrated, the lesser-oriented and the greater-oriented portions interact to form the relationship triangle discussed previously. For example, in the depicted state, a segment 2204 is in a non-parallel relationship with a segment 2206 as the segments diverge from a midpoint 2408. Similarly, it is contemplated as the dynamic portions change shape away from a planar state, the midpoint 2408 may approach another midpoint of the relationship triangle, such as a midpoint 2410. This convergence of the mid points is associated with a maximum Z-direction change of the article at the location of that relationship triangle, in an exemplary aspect. The change in the dynamic material shape forms a multi-faceted (e.g., 6 facets) volume extending in a Z-direction from a primary plane of the article. As will be appreciated, angular facets are depicted in FIGS. 21-24; however, curved features may also be implemented, as will be discussed in FIGS. 34-36 hereinafter.

Reflecting back on FIG. 21 and FIG. 24, a first state of the auxetic structure is depicted in FIG. 21 while a second state of the auxetic structure is depicted in FIG. 24. It is contemplated in an exemplary aspect that the first state of the auxetic structure may be more suitable in a warmer environment or when a user's body temperature is at a greater level than that when the auxetic structure is in the second state. For example, article, such as article of clothing, provide a better heat transfer and therefore cooling effect when in a less dimensioned state. The first state of the auxetic structure is a less dimensioned state compared to the second state of FIG. 24. Stated differently, it is contemplated that the second state of FIG. 24 provides a greater insulation coefficient than that which is provided by the first state of FIG. 21, in an exemplary aspect.

Figure 25:
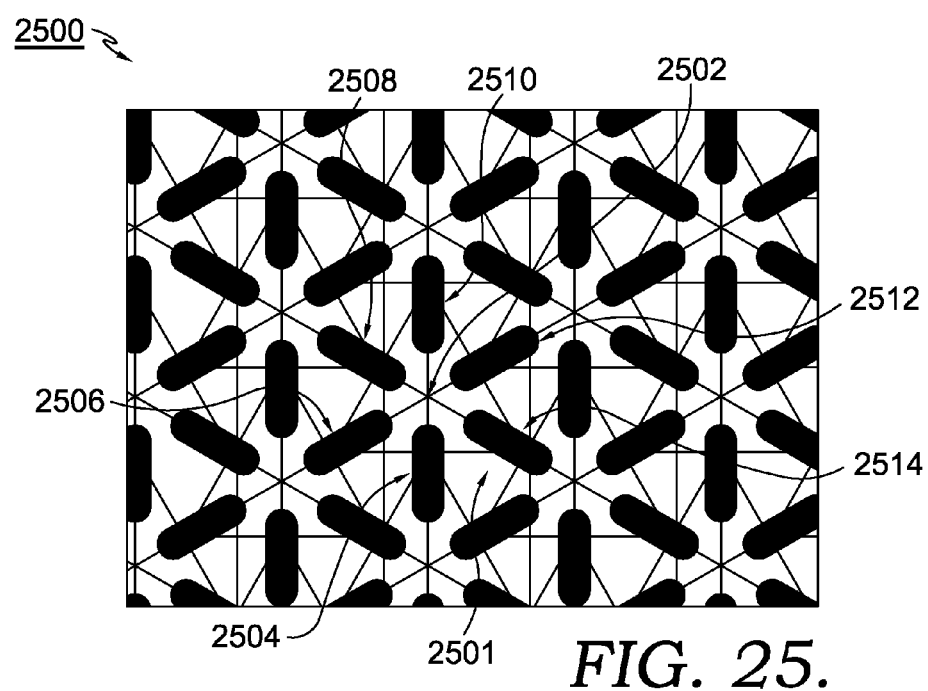
FIG. 25 depicts an alternative auxetic structure formed with a carrier material and a plurality of dynamic material portions, in accordance with aspects of the present invention.

FIG. 25 depicts an alternative auxetic structure 2500 formed with a carrier material 2501 and a plurality of dynamic material portions, in accordance with aspects of the present invention. Solid lines are also depicted extending between the dynamic material portions to highlight the orientation and geometric relationship between the dynamic material portions. While these solid lines are depicted for illustrative purposes, they are not intended to be formed on the carrier material 2501 in an exemplary aspect of the present invention.

Unlike the dynamic material portions of FIGS. 21-24 that have a greater-oriented and a lesser-oriented geometry, the dynamic material portions of the auxetic structure 2500 are uniform in nature. It is contemplated that the great-oriented and the lesser-oriented aspect provide structure advantages in some aspects while the uniform nature may provide manufacturability advantages in some aspects. However, aspects of the present invention contemplate using at least one or the other arrangements in one or more particular locations of an article.

The auxetic structure 2500 is arranged with dynamic material portions positioned at vertices and midpoints of a relationship triangle. For example, centered about a reference point 2502, portions 2506, 2510, and 2514 are positioned at the vertices of a relationship triangle centered on the reference point 2502. It should be noted to accomplish the negative Poisson's ratio of the auxetic structure, those dynamic material portions that form the vertices of a common relationship triangle also form the midpoints of different relationship triangles. Stated differently, in an exemplary aspect, an active part of a dynamic material portion that forms a vertex of a first relationship triangle will not intersect with another relationship triangle vertices. The midpoints of the relationship triangle centered about the point 2502 are portions 2512, 2504, and 2508.

Figure 26:
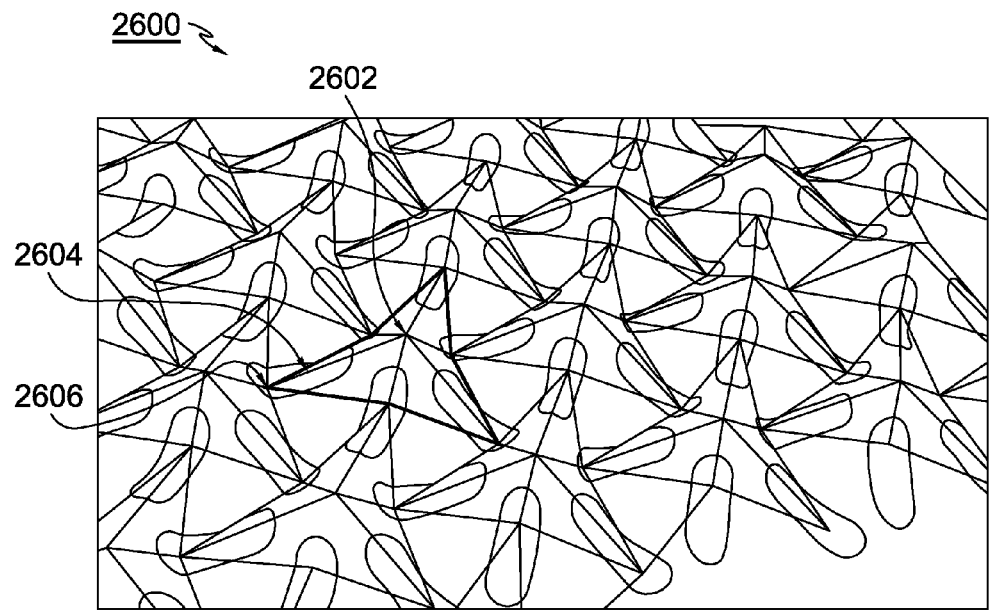
FIG. 26 depicts a dimensioned perspective of an auxetic structure having a pattern of dynamic materials similar to those depicted in FIG. 25, in accordance with aspects of the present invention.

FIG. 26 depicts a dimensioned perspective of an auxetic structure 2600 having a pattern of dynamic materials similar to those depicted in FIG. 25, in accordance with aspects of the present invention. In particular, a representative center point 2602 is depicted that extends in a positive Z-direction from a plane in which the auxetic material would reside in a non-dimensioned state. As illustrated, a dynamic material portion 2604 forms a complex shape with a crimp point at vertices 2606. The complex shape is in reference to the intersection of inverse directions of deflection that form points of binding (e.g., crimp points), as will be illustrated in FIGS. 31-33 hereinafter.

Figure 27:
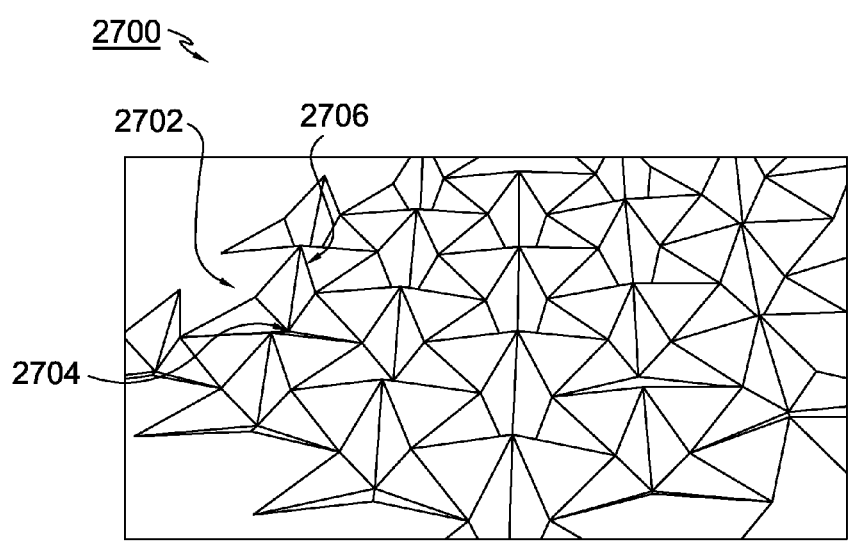
FIG. 27 depicts a dimensioned perspective of an auxetic structure having a pattern of dynamic materials similar to those depicted in FIG. 25 from an opposite surface as that which was discussed in FIG. 26, in accordance with aspects of the present invention.

FIG. 27 depicts a dimensioned perspective of an auxetic structure 2700 having a pattern of dynamic materials similar to those depicted in FIG. 25 from an opposite surface as that which was discussed in FIG. 26, in accordance with aspects of the present invention. As a result, a relationship triangle 2706 is depicted representing the dimensional deflection in the negative Z-direction of a center point 2704 of the exemplary relationship triangle (having the midpoints in the process of converging resulting in a 6-sided object). This deflection of the center point caused by dynamic material on an opposite surface of a carrier material 2702 forms a dimensioned structure of this material.

While FIGS. 21-27 depict dynamic materials that are positioned at vertices and midpoints of a relationship triangle orientation and therefore utilize complex shapes (e.g., crimping) to achieve structural aspects, FIGS. 28-30 depicts an auxetic structure that leverages the mechanical attributes of dynamic materials instead substantially utilizing a simple curve/joint to achieve structural aspects. Stated differently, instead of extending between proximate relationship triangles as depicted in FIGS. 21-27, the dynamic materials of FIGS. 28-30 substantially articulate a relative relationship triangle (e.g., a relationship triangle in which they are positioned).

FIG. 28 depicts an exemplary pattern for an auxetic structure 2800 having dynamic material portions forming simple bends, in accordance with aspects of the present invention. For example, an exemplary relationship triangle may be formed centered on an illustrative center point 2810 and including dynamic materials portions 2804, 2806, and 2808 as positioned on the carrier material 2802. While the general relative orientation of the relationship triangles in FIGS. 21-30 are similar, the manner in which the dynamic materials are used to cause the articulation of facets and portions of the resulting dimensional aspects are different, as discussed above.

FIG. 29 depicts the auxetic structure of FIG. 28 in a partially dimensioned state 2900, in accordance with aspects of the present invention. A relationship triangle is depicted for illustrative purposes having a center point 2910, from which dynamic material portions 2912, 2914, and 2916 radially extend. In this exemplary aspect, each of the dynamic material portions are centered on a bending axis extending from a vertex of the relationship triangle to the illustrative center point 2910. Further, in this example, the dynamic material portions are positioned within (or partially define) the relationship triangle for which they serve.

The material portions are contemplated as bending about a line extending down a longitudinal axis allowing opposite side portions to converge as a result of the bending action. Because the dynamic materials are affixed to or otherwise coupled/formed with the carrier material, the material also beds at these axis of deflection to form dimensioned structures.

FIG. 30 depicts the auxetic structure of FIG. 28 in a dimensioned state 3000, in accordance with aspects of the present invention. Because of the interaction of the dynamic material portions (e.g., a dynamic material portion 3006), FIG. 30 is able to illustrate a midpoint 2004 deflection that occurs even without the use of a dynamic material at the midpoint of a relationship triangle centered about a center point 3002. For example, the dynamic material portions at the vertices of the relationship triangle and the dynamic material portions at the vertices of proximate relationship triangles interact to cause a midpoint deflection.

Figure 31:
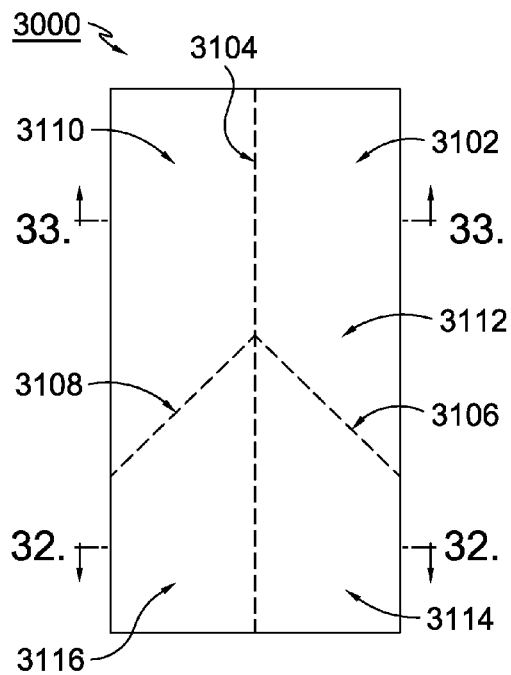
FIG. 31 depicts an exemplary dynamic material portion, in accordance with aspects of the present invention.

FIG. 31 depicts an exemplary dynamic material portion 3000, in accordance with aspects of the present invention. As previously discussed and as will be discussed in greater detail with respect to FIGS. 37A-37D hereinafter, the dynamic material may be integrated, applied, coupled, or otherwise in physical cooperation with an underlying carrier material to cause a dimensional change of the carrier material in response to a stimulus. The carrier material, as previously discussed, may be any type of material that forms a portion of an article. For example, the carrier material may be a knit, woven, extruded, non-woven, or other flexible material that may form a portion of an article.

The dynamic material portion 3000 is generally depicted as a rectangular portion with an exposed top surface 3102. However, as previously discussed and as contemplated, the dynamic material portion may have any shape (e.g., circular, oval, square, rectangular, pentagon, hexagon, organic). For ease of illustrating a complex structure, a rectangular shape is depicted in FIG. 31 (and FIG. 34 hereinafter).

Figure 32:
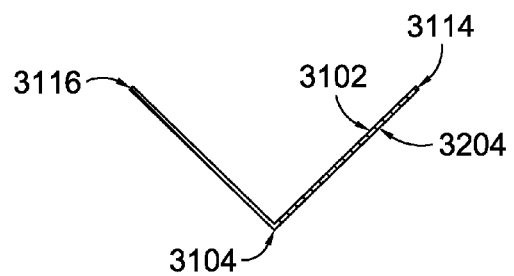
FIG. 32 depicts a cross sectional view of the dynamic material portion 3000 along cutline 32-32, in accordance with aspects of the present invention.
Figure 33:
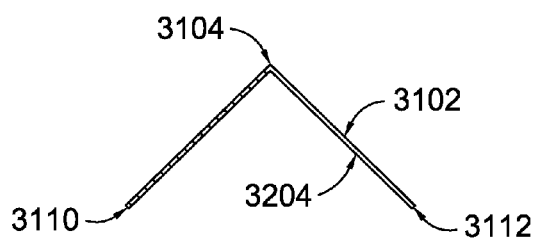
FIG. 33 depicts a cross sectional view of the dynamic material portion 3000 along cutline 33-33, in accordance with aspects of the present invention.
Figure 34:
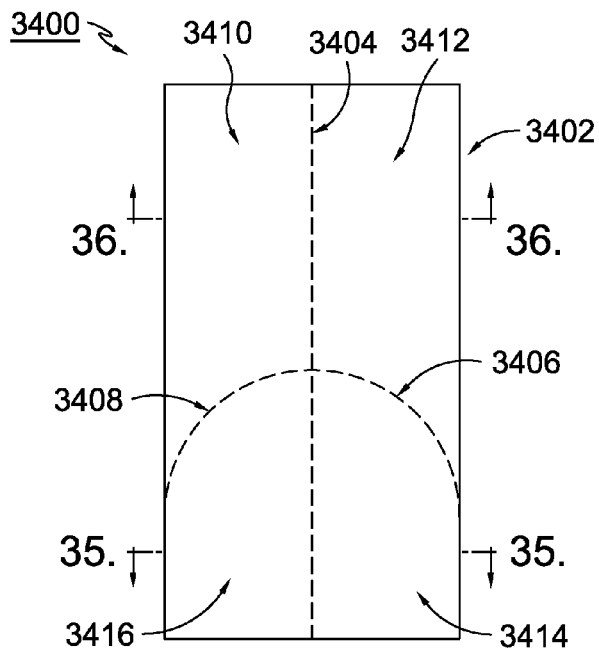
FIG. 34 depicts a dynamic material portion, in accordance with aspect of the present invention.

The dynamic material portion 3000 is depicted with a longitudinal axis 3104 extending the length of the dynamic material portion 3000. As previously discussed, it is contemplated that the longitudinal axis 3104 may be aligned with (or cause) a line segment extending from a relationship triangle and a center point of the relationship triangle, in an exemplary aspect. As depicted in FIGS. 32 and 33 hereinafter, the longitudinal axis is a line on which the dynamic material portion 3000 articulates in both a positive direction and a negative direction. It is this interaction of both a positive and a negative articulate along a common axis that provides a dimensional change to the dynamic material portion 3000, which results in an apex (e.g., crimp point) at the intersection of the longitudinal axis 3104 and a first transition line 3106 and a second transition line 3108.

At the transition lines 3106 and 3108, the dynamic material portion 3000 transitions from having a negative articulation to a positive articulation along the longitudinal axis 3104. Further, the transition lines 3106 and 3108 align with (or cerate) the sides of a relationship triangle of an exemplary auxetic structure. While the term relationship triangle is used herein as an indicator of geometric relationship among dynamic material portions and their articulation locations, it is contemplated that any geometric pattern may align with one or more articulation locations of the dynamic material portion 3000, in an exemplary aspect. In an exemplary aspect, the transition line 3106 forms an angle from the longitudinal axis 3104 that is symmetrical with the an angle created between the longitudinal axis 3104 and transition line 3108. In an exemplary aspect, the angle between a transition line and the longitudinal axis is between 22.5 and 37.5 degrees in a facet 3114 (and in a facet 3116). Consequently, an angle between the transition line 3108 and 3106 is between 45 degrees and 75 degrees. In an exemplary aspect, the angle between the transition line 3108 and 3106 is 60 degrees. As other relationship geometries are contemplated, additional angles are also contemplated that are greater than 75 degrees and less than 45 degrees, in exemplary aspects.

The dynamic material portion 3000 forms at least four facets between the longitudinal axis 3104 and the transition lines 3108 and 3106. The facets are 3110, 3112, 3116, and 3114. Facets 3110 and 3112 form a "V"-like structure (as depicted in FIG. 32) and facets 3116 and 3114 form a upside down "V"-like structure (as depicted in FIG. 33). In an exemplary aspect, the orientation of the dynamic material portion 3000 affects the resulting dimensional structure. For example, the previously discussed greater oriented portions of FIG. 20 (e.g., Portions 2004, 2006, and 2008) would have the facets 3110 and 3112 oriented proximate the circular area 2002 of FIG. 20. Further, the lesser oriented portions of FIG. 20 would have the facets 3116 and 3114 oriented proximate the circular area 2002 of FIG. 20. Stated differently, it is contemplated that the facets 3116 and 3114 form the vertices of a relationship triangle while the faces 3110 and 3112 are arranged along midpoints of a relationship triangle.

FIG. 32 depicts a cross sectional view of the dynamic material portion 3000 along cutline 32-32, in accordance with aspects of the present invention. The dynamic material portion 3000 is depicted having the top surface 3102 and a bottom surface 3204. Also depicted are the facets 3114 and 3116 as they extend from the longitudinal axis 3104.

FIG. 33 depicts a cross sectional view of the dynamic material portion 3000 along cutline 33-33, in accordance with aspects of the present invention. The dynamic material portion 3000 is depicted having the top surface 3102 and the bottom surface 3204. Also depicted are the facets 3110 and 3112 as they extend from the longitudinal axis 3104.

Similar to FIG. 31 discussed above, FIG. 34 depicts a dynamic material portion 3400, in accordance with aspect of the present invention. In particular, the dynamic material portion 3400 relies on a convex curve and a concave curve forming a complex curve (of this complex shape) that provides the structural form for creating dimensionality. For example, facets 3410 and 3412 formed above transition arc 3408 and transition arc 3406 respectively are convex in this example, as depicted in FIG. 36 hereinafter. Facets 3416 and 3414 formed below the transition arc 3408 and transition arc 3406 respectively are concave in this example, as depicted in FIG. 35 hereinafter.

The radius of the transition arc 3406 and 3408 may vary depending on the geometry of the relationship between dynamic material portions. As discussed with respect to FIG. 31, the angle of a transition line off of a longitudinal axis 3404 may be altered, just as a radius defining transition arcs may be altered, to achieve a desired structure and resulting dimension when a plurality of dynamic material portions are utilized together.

Figure 35:
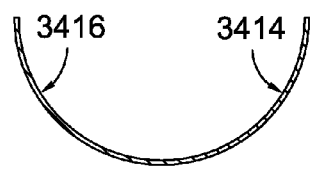
FIG. 35 depicts a cross sectional view of the dynamic material portion along cutline 35-35, in accordance with aspects of the present invention.
Figure 36:
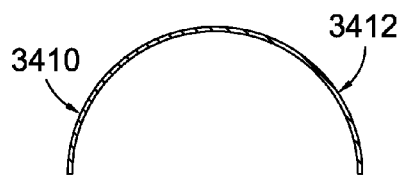
FIG. 36 depicts a cross sectional view of the dynamic material portion along cutline 36-36, in accordance with aspects of the present invention.

FIG. 35 depicts a cross sectional view of the dynamic material portion 3400 along cutline 35-35, in accordance with aspects of the present invention. Facets 3414 and 3416 are depicted in this concave curve structure.

FIG. 36 depicts a cross sectional view of the dynamic material portion 3400 along cutline 36-36, in accordance with aspects of the present invention. Facets 3410 and 3412 are depicted in this convex curve structure.

Consequently, it is contemplated that complex curves/bends may be implemented to form a structural member from dynamic materials in an exemplary aspect. Examples of complex curves/bends were discussed in connection with at least FIGS. 20 and 25. It is further contemplated that simple curves/bends may be implemented from dynamic materials in an exemplary aspect. An example of a simple curve/bend relationship was discussed in connection with at least FIG. 28. Further, it is contemplated that any combination of simple and/or complex curves/bends may be used in a common article to achieve a desired change in dimensionality by dynamic materials.

From the foregoing, it is contemplated that an article of clothing, such as a shirt, shorts, pants, outwear (e.g., coat, snow pants, rain pants) or any other garment to be worn may be formed having an auxetic structure that is able to be changed in shape based on the force applied to the underlying carrier material by a dynamic material. This is in contrast to a force being applied by a non-associated input, such as a human. Because it is contemplated that the dynamic material is integrated into an article of clothing, it is contemplated that the carrier material on which the dynamic materials are integrated is flexible in nature, such as is typically used in an article of clothing. On the carrier material a number of dynamic material portions are positioned. For example it is contemplated that the dynamic material portions may be oriented in a radial manner about a common point. In this example, it is contemplated that a complex shape (e.g., complex bend forming a crimp point and a complex curve forming a crimp arc) is formed by the dynamic material portion. When a stimulus is realized by the dynamic material, such as thermal energy, the auxetic structure formed by the carrier material and the dynamic material changed from a first thickness to a second thickens. It is understood that the "thickness" of the structure is not limited to a thickness of the combined materials, but instead a measure of the dimensionality as formed by the tessellation or movement of the dynamic materials. Stated differently, the thickness is measured based on the offset distance of a center point of a relationship triangle when in a dimensioned state from a plane the materials would be located in absent the dimensionality created by the dynamic materials. Stated in yet a different manner, the "thickness" may be a measure of loft-forming volume created by the offset of portions of the auxetic structure.

The method of manufacturing an article having dynamic material integrated therein for forming a dimensioned product may occur in a number of contemplated manners. For example, it is contemplated that the dynamic material is integrated into the article. This integration may include applying a laminate of dynamic materials to a carrier material, printing a dynamic material to the carrier material, and/or integrating dynamic materials at the fiber level (e.g., inserting dynamic material infused fibers into the manufactured carrier material). This integration may occur at any stage of manufacture of the article. For example, the integration may be a post-process integration, during assembly, or at any point materials of the article are being handled. Further, it is contemplated that the dynamic material are integrated in a two-dimensional manner and then later taught a three-dimensional shape. Further, it is contemplated that the dynamic material are inserted in a two dimensional manner, taught a relatively two-dimensional shape and then formed in a three dimensional manner.

An additional step in the method may include the integration of one or more biasing portions. The biasing portions may be integrate at a common time (or with) the dynamic materials. They may be integrated at a later time, such as during a teaching phase, or they may be integrated after the dynamic materials are exposed to one or more teaching steps. The biasing material may be integrated in the manners described with the dynamic materials, such as printing, bonding, laminating, fiber-level integration, and/or mechanical coupling.

Another step in an exemplary aspect of manufacturing a dynamic material integrated article includes the programming the dynamic material in a first shape. The programming, as discussed hereinabove, may include exposing the material to a stimulus above a threshold for that material. For example, then the dynamic material is a shape memory polymer, the teaching may be performed with thermal energy at a temperature above or near the glass transition temperature of the material.

Yet another step in an exemplary aspect of manufacturing a dynamic material integrated article includes exposing the dynamic material to a stimulus sufficient to changing from a second shape to the first shape. In this example, the second shape may be a dimensioned shape creating a loft-like volume (e.g., a thicker thickness than the first shape). Upon the application of a stimulus, such as thermal energy, the dynamic material changes from the second shape to the first shape. This application of stimulus causing a change from the second shape to the first shape may be used to ensure the first shape was learned as taught, in an exemplary aspect.

Permeable Structures

Aspects of the present invention contemplate implementing dynamic materials to alter the permeability characteristics of an article. For example, as discussed with respect to at least FIGS. 10A-10C and FIGS. 16-19b, it is contemplated that permeability for air movement and/or moisture movement may be altered through the manipulation of an article by a dynamic material. An additional concept contemplated for facilitating dynamic material driven permeability in an article ide depicted in FIGS. 38-42 discussed hereinafter.

Figure 38:
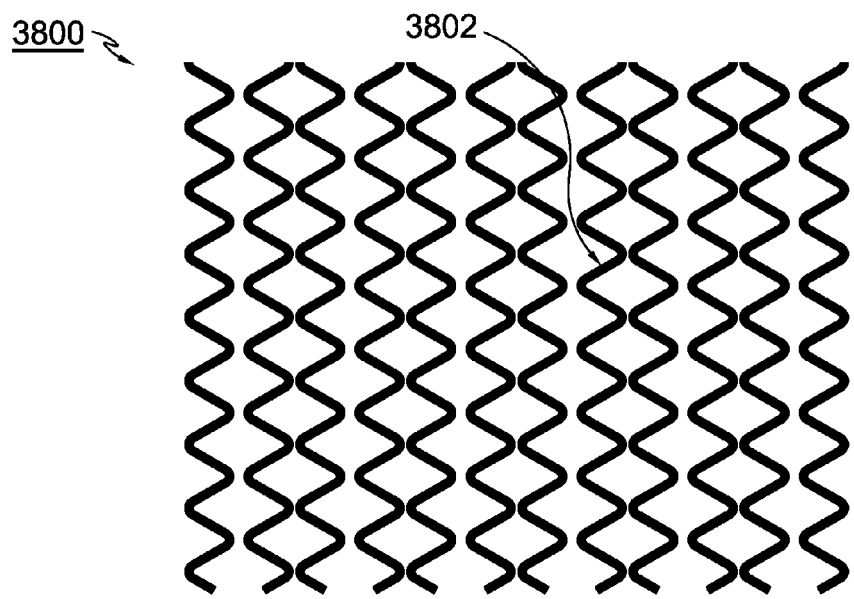
FIG. 38 depicts a series of dynamic materials segments, in accordance with aspects of the present invention.

FIG. 38 depicts a series of dynamic materials segments 3800, in accordance with aspects of the present invention. The dynamic material forms segments that are coupled with, formed on, integrated with, or otherwise connected to a carrier material that forms a portion of an article. The dynamic material segments, such as a segment 3802, cause and elongation of the segment and an associated portion of a carrier material in response to a stimulus. For example, in response to an increase in thermal energy (e.g., a rise in temperature for a wearer of the article), the dynamic material segments stretch from end to end. The increase in length may be accomplished through the dynamic material increasing the angle between one or more of the zigzag segments of the length of dynamic material segment.

Figure 39:
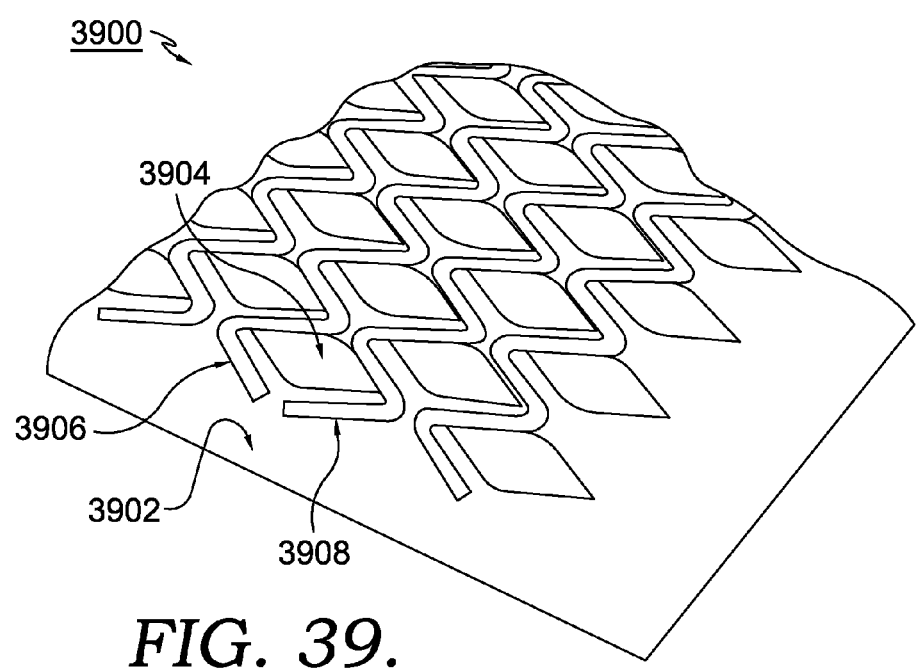
FIG. 39 depicts a dynamic material actuated permeable structure in a "closed" orientation, in accordance with aspects of the present invention.

FIG. 39 depicts a dynamic material actuated permeable structure 3900 in a "closed" orientation, in accordance with aspects of the present invention. A series of dynamic material segments, such as segments 3906 and 3908 are associated with a dual-layer material. The dual-layer material has a top layer of material 3902 and a bottom layer material 3904. The top layer 3902 and the bottom layer 3904 have opposite but corresponding half-diamond cuts forming "gill" portions extending through the layers. The gill portions provide the appearance of a diamond shape based on the intermingling of the top layer 3902 half-diamond cut and the bottom layer 3904 opposite half diamond cut.

As will be depicted in the following figures, as the dynamic material segments 3906 and 3908 extend in response to a stimulus (e.g., an increase in thermal energy), the bottom layer 3904 is compressed laterally by the reducing width of the top layer 3902 half diamond cut, which results in an upward "puckering" of the bottom layer 3904 gill segment. A similar action occurs to the top layer 3902 as it extends through the bottom layer 3904. This coordinated puckering action creates a channel through which gas and moisture may pass.

Figure 40:
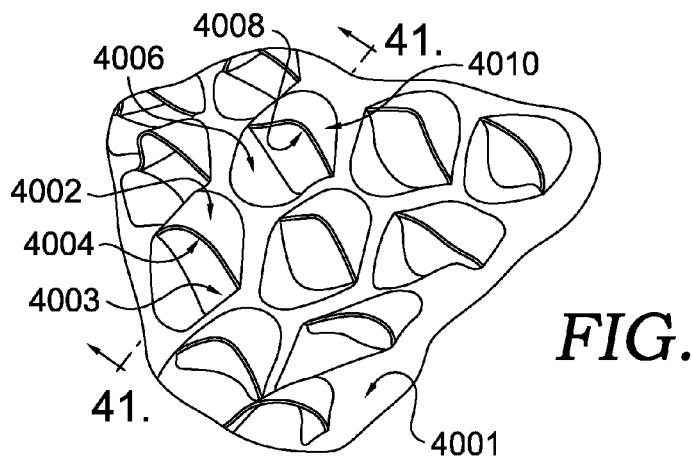
FIG. 40 depicts a dynamic material actuated permeable structure in an "open" orientation, in accordance with aspects of the present invention.

FIG. 40 depicts a dynamic material actuated permeable structure 4000 in an "open" orientation, in accordance with aspects of the present invention. The dynamic material segments are not depicted in FIG. 40; however, it is contemplated that dynamic material segments are used. The dynamic material segments may be positioned on a top surface of the top material, on a bottom surface of the bottom material and/or between the top and bottom materials, in exemplary aspects.

The dynamic material actuated permeable structure 4000 is in an open state having a "puckering" effect of a bottom material as it extends through a top material 4001. For example, the bottom material has a first gill portion top surface 4002 and a first gill portion bottom surface 4004. The first gill portion also is formed from the top material 4001 with a top surface portion 4003. A second gill portions is depicted with a top material 4001 top surface portion 4006. The second gill portion is further formed from the bottom material extending through the top material 4001 with a bottom material top surface 4010. This second gill portion provide an opening for heat, air, and moisture to transfer through the dynamic material actuated permeable structure 4000, the opening formed in the second gill portion is identified with a numbering 4008. This puckering effect is replicated on the bottom material as gill portions of the top material extend through the bottom material, in an exemplary aspect.

Figure 41:
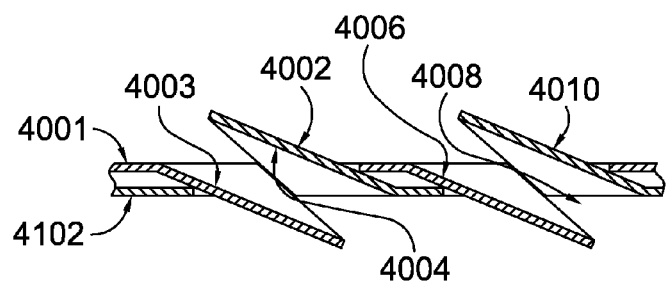
FIG. 41 depicts a cross sectional view along a cutline 41-41 of FIG. 40, in accordance with aspects of the present invention.

FIG. 41 depicts a cross sectional view along a cutline 41-41 of FIG. 40, in accordance with aspects of the present invention. The top material 4001 and a bottom material 4102 are depicted with the intermingling of gill portions formed from half diamond cuts in each layer. For example, a first gill portion top surface 4003 of the top material 4001 is depicted passing below a gill portion of the bottom material 4102. This first gill portion bottom material 4102 has a top surface 4002 and a bottom surface 4004. A second gill portion is depicted having the top material 4001 with a top surface 4006 on the second gill portion passing below the bottom material 4102. The bottom surface 4102 in the second gill portion has an exposed top surface 4010 that passes above the top material 4001, in this open structure. The opening of the first gill portion and the second gill portion through the movement of the dynamic material creates the opening 4008 of the second gill portion through which heat and moisture may more easily pass.

Figure 42:
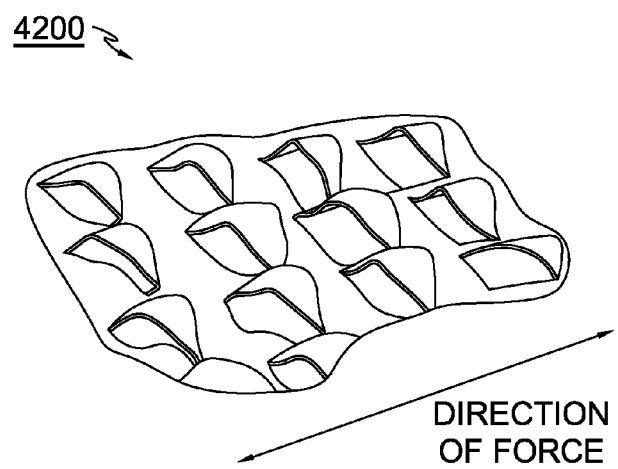
FIG. 42 depicts dynamic material actuated permeable structure in an open state, in accordance with aspects of the present invention.

FIG. 42 depicts dynamic material actuated permeable structure 4200 in an open state, in accordance with aspects of the present invention. In particular, a relative direction of force applied by the dynamic material portions is illustrated to depict the direction causing the opening of the channels through which air may pass. It is contemplated that the greater the increase in temperature, the greater amount of force applied, resulting in a greater amount of opening by the gill structures. Consequently, the greater the permeability, the better the article is at expelling excess heat and allowing for a cooling effect, which may translate into a reducing in thermal energy stimulus being applied to the SMP. Therefore, it is contemplated that the dynamic material and carrier materials form a self-regulating passive thermal management system. Stated differently, the greater a temperature of a wearer's body, the more permeability the article provides. Similarly, as the thermal energy expelled by the wearer decreases, so does the permeability of the article until the first material and the second material are in a coordinated flush state effectively closing the channels formed in the gill portions.

In view of the aspects contemplated above, an exemplary permeable structure for an article of clothing (e.g., shirt, shorts, pants, outerwear, head wear, hand wear, and footwear) may include a first material portion, such as those types of materials provided herein as carrier material. The first material has a top surface and an opposite bottom surface, a first end and an opposite second end, and a first side and an opposite second side. The permeable structure also is formed with a second material portion having a top surface and an opposite bottom surface, a first end and an opposite second end, and a first side and an opposite second side. The first material portion and the second material portions are aligned on top of one another.

In this exemplary permeable structure, the first material forms a gill, such as a half diamond-shaped gill. Similarly, the second material also has a gill, which may be an opposite, but symmetrical gill to that of the first material. In combination, it is contemplated that the two gills operate together to form a permeability channel through which air, heat, and/or moisture may transfer. However, it is also contemplated that a single gill may be implemented to achieve the desired increase in permeability. The formation of the gill may be accomplished with a gill slit extending through the material top surface and bottom surface and extending in a first-side-to-second-side direction with an inflection point more proximate the first end than the second end, the first material gill slit forming a first material gill. It is contemplated that this gill slit may be linear or curved. For example, a linear gill slit may have an inflection point that is a vertex of a to-be-formed half diamond gill. Similarly, the gill slit may be curved having an inflection point that is an apex of the curve. The inflection points are generally in a more first end or second end that the starting points of the gill slit.

Together, a gill from the first material and a corresponding but opposite gill from the second material may pass through the opposite material to form a channel-like structure that when a dimensional geometric change occurs, opens the channel to increase permeability. This dimensional change may be accomplished with a dynamic material, such as a shape memory polymer, coupled to at least the first material, if not also the second material. When a stimulus is applied to the dynamic material, a compressive or tension force is exerted by the dynamic material one or more portions of the first material and/or the second material that causes an elongation of the portions affected. The elongation force causes a puckering effect where the inflection points extend in a Z-direction away from a plane in which they were positioned prior to the elongation. This puckering effect in essence forms a dimensional apex in the Z-direction as the gills stand off from the material through which they extend or are formed.

The manufacturing of an exemplary aspect is provided herein. However, it is contemplated that additional or different steps may be implemented to accomplish the same. The method may include a step of integrating a dynamic material with an article. As previously discussed, the integration may include printing, bonding, laminating, and/or fiber-level integration. The method may include programming the dynamic material in a first shape. In an exemplary aspect, the dynamic material may be formed in a zigzag manner and then programmed in a more linear (e.g., straighter) manner. In this example, if the dynamic material is a shape memory polymer responsive to heat, as a wearer of the article generates more heat, the dynamic material straightens, which causes an elongation force that translates into an opening of one or more gills. The method may also include the creating of a gill in a first material and/or creating a gill in a second material of the article. The gill portions may then be caused to extend through a gill slit used to form the opposite gill. In an exemplary aspect.

While specific implementations of dynamic materials and material assemblies are provided herein, it is understood that additional mechanical structures and variations to depicted mechanical structures are contemplated. Variations in size, geometry, and orientation of one or more portions of a mechanical structure are contemplated while allowing for a dynamic material to aid in controlling environmental conditions of an article. Therefore, although the construction is described above by referring to particular aspects, it should be understood that the modifications and variations could be made to the construction described without departing from the intended scope of protection provided by the following claims.

The invention claimed is:

1. An article of apparel comprising:
   a carrier material that is flexible;
   a plurality of dynamic material portions physically associated with the carrier material such that the carrier material and the plurality of dynamic material portions form an auxetic structure geometrically responsive to a stimulus; and
   the auxetic structure extending in an X-Y plane and being convertible between a first state and a second state in response to a transition from a first stimulus to a second stimulus, wherein, in response to the transition from the first stimulus to the second stimulus, the plurality of dynamic material portions responds by extending in an x-direction of the X-Y plane to cause the auxetic structure lengthen in a y-direction of the X-Y plane.

2. The article of apparel of claim 1, wherein the carrier material is a woven material, a knit material, or non-woven material.

3. The article of apparel of claim 1,
   wherein the auxetic structure further comprises a thickness in a Z-direction perpendicular to the X-Y plane,
   wherein the plurality of dynamic material portions are arranged in a first thickness of the auxetic structure in the Z-direction in the first state and are arranged in a second thickness of the auxetic structure in the Z-direction in the second state, and
   wherein the auxetic structure transitions from the first thickness to the second thickness in response to the transition from the first stimulus to the second stimulus.

4. The article of apparel of claim 3, wherein the first thickness is thicker than the second thickness.

5. The article of apparel of claim 1, wherein the first stimulus and the second stimulus include respective quantities of thermal energy.

6. The article of apparel of claim 1, wherein the first stimulus and the second stimulus include respective quantities of moisture.

7. The article of apparel of claim 1, wherein the first stimulus and the second stimulus include respective quantities of mechanical energy.

8. The article of apparel of claim 1, wherein a first dynamic material portion forms a complex shape with a positive bend and a negative bend along a common axis of the first dynamic material portion.

9. The article of apparel of claim 1, wherein a first dynamic material portion forms a complex curve with a concave curve and a convex curve along a common axis of the first dynamic material portion.

10. An article of apparel comprising:
    a carrier material that is flexible; and
    a plurality of dynamic material portions physically associated with the flexible carrier material and geometrically responsive to a stimulus,
       wherein the plurality of dynamic material portions includes a first plurality of elongated portions extending in a first direction and a second plurality of elongated portions extending in a second direction, and
       wherein the first plurality of elongated portions and the second plurality of elongated portions intersect to form an auxetic lattice structure that is convertible between a first state and a second state in response to a change from a first quantity of the stimulus to a second quantity of the stimulus.

11. The article of apparel of claim 10, wherein elongated portions included in the first plurality of elongated portions are aligned substantially parallel to one another and elongated portions included in the second plurality of elongated portions are aligned substantially parallel to one another.

12. The article of apparel of claim 10,
    wherein the auxetic lattice structure extends in an X-Y plane, and
    wherein in response to a transition from a first amount of the stimulus to a second amount of the stimulus, the first plurality of elongated portions responds by extending in an x-direction of the X-Y plane to extend the second plurality of elongated portions in a y-direction of the X-Y plane.

13. The article of apparel of claim 10,
    wherein in the first state the first plurality of elongated portions includes a first length, and
    wherein in the second state the first plurality of elongated portions includes a second length, which is longer than the first length.

14. The article of apparel of claim 10, wherein the first quantity and the second quantity include respective quantities of thermal energy.

15. The article of apparel of claim 10, wherein the first quantity and the second quantity include respective quantities of moisture.

16. The article of apparel of claim 10, wherein the first quantity and the second quantity include respective quantities of mechanical energy.

17. A method of manufacturing an article of apparel, the method comprising:
    physically incorporating a first plurality of elongated dynamic material portions with a carrier material, the first plurality of elongated dynamic material portions being geometrically responsive to a stimulus changing from a first stimulus quantity to as second stimulus quantity;
    physically incorporating a second plurality of elongated dynamic material portions with the carrier material, such that the first plurality of elongated dynamic material portions and the second plurality of elongated dynamic material portions are arranged to intersect and to form an auxetic lattice structure; and
    the auxetic lattice structure extending in an X-Y plane, and the auxetic lattice structure being convertible between a first state and a second state when the first plurality of elongated dynamic material portions lengthen in an x-direction of the X-Y plane in response to the stimulus changing from the first stimulus quantity to the second stimulus quantity.

18. The method of claim 17, wherein physically incorporating includes screen printing or laminating, such that the first and second plurality of elongated dynamic material portions are screen printed or laminated onto to a surface of the carrier material.

19. The method of claim 17, wherein physically incorporating includes integrating the first and second plurality of elongated dynamic material portions with the carrier material by interweaving, interknitting, or a combination thereof.

20. The method of claim 17, wherein auxetic lattice structure is laser cut, die cut, or knife cut from a sheet of the dynamic material.

* * * * *

UNITED STATES PATENT AND TRADEMARK OFFICE
CERTIFICATE OF CORRECTION

PATENT NO. : 9,668,531 B2  Page 1 of 1
APPLICATION NO. : 14/936821
DATED : June 6, 2017
INVENTOR(S) : Matthew D. Nordstrom et al.

It is certified that error appears in the above-identified patent and that said Letters Patent is hereby corrected as shown below:

In the Claims

Column 28, Line 55: Please remove "as" and replace with --a--.
Column 29, Line 6: Please remove "to" following the word "onto".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*